US006657544B2

(12) United States Patent
Barry et al.

(10) Patent No.: US 6,657,544 B2
(45) Date of Patent: Dec. 2, 2003

(54) APPARATUS AND METHOD FOR ELECTRONIC EXCLUSION AND CONFINEMENT OF ANIMALS RELATIVE TO A SELECTED AREA

(75) Inventors: James R. Barry, Prior Lake, MN (US); John S. Titus, Prior Lake, MN (US); Dennis L. Larson, Andover, MN (US)

(73) Assignee: Joint Techno Concepts International, Inc., Westboro, MA (US)

( * ) Notice: Subject to any disclaimer, the term of this patent is extended or adjusted under 35 U.S.C. 154(b) by 181 days.

(21) Appl. No.: 09/774,923

(22) Filed: Jan. 31, 2001

(65) Prior Publication Data
US 2001/0032598 A1 Oct. 25, 2001

Related U.S. Application Data

(63) Continuation-in-part of application No. 09/128,246, filed on Aug. 3, 1998, now abandoned, which is a continuation of application No. 08/796,986, filed on Feb. 7, 1997, now Pat. No. 5,787,841, which is a continuation-in-part of application No. 08/741,852, filed on Oct. 29, 1996, now Pat. No. 5,794,569.

(51) Int. Cl.[7] .............................................. G08B 23/00
(52) U.S. Cl. ................................... 340/573.3; 119/721
(58) Field of Search ............................ 340/573.3, 505, 340/10.1; 119/720, 721

(56) References Cited

U.S. PATENT DOCUMENTS 3,753,421 A   8/1973   Peck ........................ 119/721
4,150,464 A   4/1979   Tracy ........................ 24/313
4,171,555 A  10/1979   Bakker et al. ................ 24/200
4,180,013 A  12/1979   Smith ........................ 119/718
4,669,424 A   6/1987   Bianco et al. ............... 119/650
4,733,633 A   3/1988   Yarnall, Sr. et al. ......... 119/721

(List continued on next page.)

FOREIGN PATENT DOCUMENTS

| GB | 2 265 038 | 9/1993 |
| WO | 96/04628 | 2/1996 |
| WO | 96/30882 | 10/1996 |
| WO | WO 98/34473 | 8/1998 |

Primary Examiner—Thomas Mullen
(74) Attorney, Agent, or Firm—Merchant & Gould

(57) ABSTRACT

The present invention discloses a method and apparatus for electronically deterring an animal from approaching an exclusion area around an exclusion unit or from entering or leaving an area bounded by a wire. The animal is provided with a collar unit, which includes a sensor adapted to sense the strength of electromagnetic signals generated by the exclusion unit or wire and a correction unit adapted to provide correction to the animal in response to a sensor output. The portable unit reports to a central controller which selects a correction strategy, such as level of correction to be applied to the animal approaching the perimeter. The controller provides warnings to the user, including warnings for when the battery in the collar unit goes low and when the animal stays in a correction zone for too long. The controller may control a number of exclusion units and/or power units, and may select an appropriate correction for one of a plurality of animals. The apparatus, with a central controller, may also be used to contain animals within one or more containment areas.

24 Claims, 20 Drawing Sheets

U.S. PATENT DOCUMENTS

| | | | |
|---|---|---|---|
| 4,745,882 A | 5/1988 | Yarnall, Sr. et al. | 119/721 |
| 4,766,847 A | 8/1988 | Venczel et al. | 119/721 |
| 4,898,120 A | 2/1990 | Brose | 119/721 |
| 4,919,082 A | 4/1990 | Tsai | 119/720 |
| 4,967,695 A | 11/1990 | Giunta | 119/721 |
| 4,996,945 A | 3/1991 | Dix, Jr. | 119/721 |
| 5,053,768 A | 10/1991 | Dix, Jr. | 340/988 |
| 5,067,441 A | 11/1991 | Weinstein | 119/721 |
| 5,120,711 A | 6/1992 | Magyar et al. | 514/11 |
| D330,173 S | 10/1992 | Juliana et al. | D10/106 |
| D330,685 S | 11/1992 | Juliana et al. | D10/106 |
| 5,161,485 A | 11/1992 | McDade | 119/859 |
| 5,170,149 A | 12/1992 | Yarnall, Sr. et al. | 340/573.3 |
| 5,207,178 A | 5/1993 | McDade et al. | 119/859 |
| 5,207,179 A | 5/1993 | Arthur et al. | 119/721 |
| D336,055 S | 6/1993 | Juliana et al. | D10/106 |
| 5,218,344 A | 6/1993 | Ricketts | 340/573 |
| 5,241,923 A | 9/1993 | Janning | 119/721 |
| 5,307,763 A | 5/1994 | Arthur et al. | 119/718 |
| 5,349,926 A | 9/1994 | McCarney et al. | 119/721 |
| 5,353,744 A | 10/1994 | Custer | 119/719 |
| 5,381,129 A | 1/1995 | Boardman | 340/573.3 |
| 5,408,956 A | 4/1995 | Quigley | 119/720 |
| 5,425,330 A | 6/1995 | Touchton et al. | 119/721 |
| 5,435,271 A | 7/1995 | Touchton et al. | 119/721 |
| 5,445,900 A | 8/1995 | Miller, Jr. et al. | 429/1 |
| 5,460,124 A | 10/1995 | Grimsley et al. | 119/721 |
| 5,476,729 A | 12/1995 | Miller, Jr. et al. | 429/1 |
| 5,559,498 A | 9/1996 | Westrick et al. | 340/573.3 |
| 5,575,242 A | 11/1996 | Davis et al. | 119/721 |
| 5,636,597 A | 6/1997 | Van Curen et al. | 119/720 |
| 5,787,841 A | 8/1998 | Titus et al. | 119/721 |
| 5,794,569 A | 8/1998 | Titus et al. | 119/721 |
| 5,808,551 A * | 9/1998 | Yarnall, Jr. et al. | 340/573.3 |
| 5,901,660 A | 5/1999 | Stein | 119/51.02 |
| 2001/0042522 A1 | 11/2001 | Barry et al. | 119/721 |

* cited by examiner

APPARATUS AND METHOD FOR ELECTRONIC EXCLUSION AND CONFINEMENT OF ANIMALS RELATIVE TO A SELECTED AREA

This application is a continuation-in-part of application Ser. No. 09/128,246 filed Aug. 3, 1998, now abandoned, which is a continuation of application Ser. No. 08/796,986, filed Feb. 7, 1997, now U.S. Pat. No. 5,787,841 which is a continuation-in-part of application Ser. No. 08/741,852, filed Oct. 29, 1996, now U.S. Pat. No. 5,794,569.

FIELD OF THE INVENTION

This invention relates in general to a method and apparatus for controlling movement of an animal and, in particular, to a method and apparatus for electronically preventing an animal from approaching an area to be protected from intrusion by the animal.

BACKGROUND OF THE INVENTION

Electronic animal control systems commonly either contain an animal within a perimeter delineated by a wire, or are of the form of an "electronic tether." When using a typical perimeter device, the animal is deterred from crossing the perimeter by applying an electronic correction signal to the animal after it approaches within a preselected distance of the wire. Detecting the proximity of the wire is typically performed by use of a sensor on a collar unit provided on the animal, where the sensor senses an electromagnetic field around the wire. The electronic correction is supplied by the collar unit and is typically either an acoustic signal or an electric shock.

"Electronic tether" systems use a similar collar unit but, in this case, the electronic correction is applied to the animal when the distance between a collar unit and a central transmitter is too great, as measured by the strength of a received electromagnetic signal. The animal receives correction when it has strayed too far from the central transmitter.

These electronic animal control systems are relatively unsophisticated devices, and are not well suited to use indoors. For example, it would appear that an outdoor perimeter device could be used indoors to deter an animal from approaching a door, thus keeping the animal in the room. However, such a perimeter unit requires that a perimeter wire be laid around the entire room, which significantly reduces the area within the room in which the animal may roam without receiving correction. Additionally, present electronic control systems are unable to distinguish which of several animals requires attention, assuming that more than one animal is provided with a collar unit, and the control systems, therefore, treat all animals in the same manner. Typically, no record is kept of animal activity, for example how many corrections the animal received in any particular time period.

A conventional collar unit is generally an autonomous unit which is battery powered. The lifetime of the battery is affected by many factors, including the number of corrections which are provided to the animal. The user is not provided with information regarding the number of corrections the animal receives, nor with the current state of the battery. Thus, the user may be unaware that the battery has lost charge, and the user has to guess when a new battery is needed in the collar unit. Additionally, a conventional collar unit is provided with metal contact pins of fixed length. These pins, typically of fixed length, may have to be changed according to the thickness of the coat of the animal. For example, a dog with a thin coat, such as Doberman Pinscher, requires shorter pins, while a dog with a long coat, such as an English Sheepdog, requires longer pins. Current collar units provide the user with a number of sets of pins, which the user has to connect manually to the collar unit. The pins would require changing if, for example, a collar unit normally used on a dog with a thin coat, were to be used on a dog with a thicker coat.

Indoor pet control systems are available which repel a pet from a prescribed area. Such systems typically use ultrasonic transmitters to generate a continuous repulsion signal. The animal is dissuaded from entering the area simply because the volume of the ultrasonic signal is uncomfortably high. Systems of this type suffer from several deficiencies, including a lack of intelligence, so the system cannot distinguish between different animals which may approach the protected area. Since the ultrasonic signal is generally continuous, the animal is subjected to constant annoyance, even when outside the area being protected.

Therefore, there is a need for an electronic animal control system which does not confine an animal to only a portion of a room when the desired restriction is simply to prevent it from leaving the room. There is also a need for a more sophisticated system which is able to warn the user when an animal receives correction or when the battery in the collar unit is low. There is a general need for a more sophisticated approach to electronically controlling an animal which can provide the user with many advanced features not available with current systems, including the management of a number of containment spaces, and where each containment space may be pre-programmed to be applicable to each particular animal present. There is also a need for a collar unit having improved metal contact pins which do not require repeated adjustment or reinstallation by the user.

SUMMARY OF THE INVENTION

To overcome the limitations in the prior art, such as those described above, and to overcome other limitations that will become apparent upon reading and understanding the present specification, the present invention is directed to a method and apparatus for communicating signals directly to the portable unit other than through the energy used to created the exclusion area or the bounded area.

The invention may be viewed as a portable unit for providing a correction to an animal. The portable unit includes a sensor configured to detect a first signal indicating that the animal has approached an inappropriate location. The portable unit includes a transmitter configured to provide a second signal indicating information about the portable unit. The portable unit also includes a receiver configured to detect a third signal having an instruction for the portable unit.

The invention may also be viewed as a method for providing correction to an animal. The method involves providing a second signal from the portable unit to send information about the portable unit to a controller unit. The second signal is received at the controller unit and an appropriate correction is determined. A third signal is provided from the controller unit to the portable unit to indicate the correction. The third signal is received at the portable unit to provide the appropriate correction.

BRIEF DESCRIPTION OF THE DRAWINGS

Referring now to the drawings in which like reference numbers represent corresponding parts throughout.

DETAILED DESCRIPTION OF THE ILLUSTRATED EMBODIMENTS

In the following description of the illustrated embodiment, reference is made to the accompanying drawings which form a part hereof, and in which is shown by way of illustration, various embodiments in which the invention may be practiced. It is to be understood that other embodiments may be utilized and structural changes may be made without departing from the scope of the present invention.

The present invention is directed to an apparatus for electronically controlling the movement of an animal with respect to a prescribed area. Typically, the animal may be a pet, and the prescribed area, such as an exclusion area, may be a portion of a front or back yard, or may be an area within a house, such as an area around a doorway or close to selected items of furniture which the owner wishes to protect. Unlike prior methods of electronically controlling the movement of animals, the present invention allows the animal to roam freely outside the exclusion area, and provides a warning to the animal when the animal approaches the exclusion area. The warning typically includes a correction, preferably in the form of an audible signal or an electric shock, in order to dissuade the animal from making any further approach to the exclusion area. The invention is particularly effective in preventing an animal from approaching a doorway or archway in a house, which represents an important capability when electronically restricting the movement of a pet within a house. The illustrated embodiments are discussed in terms of protecting doorways and archways within a house, but the invention is not restricted to such use, as is discussed hereinbelow.

Figure 1:
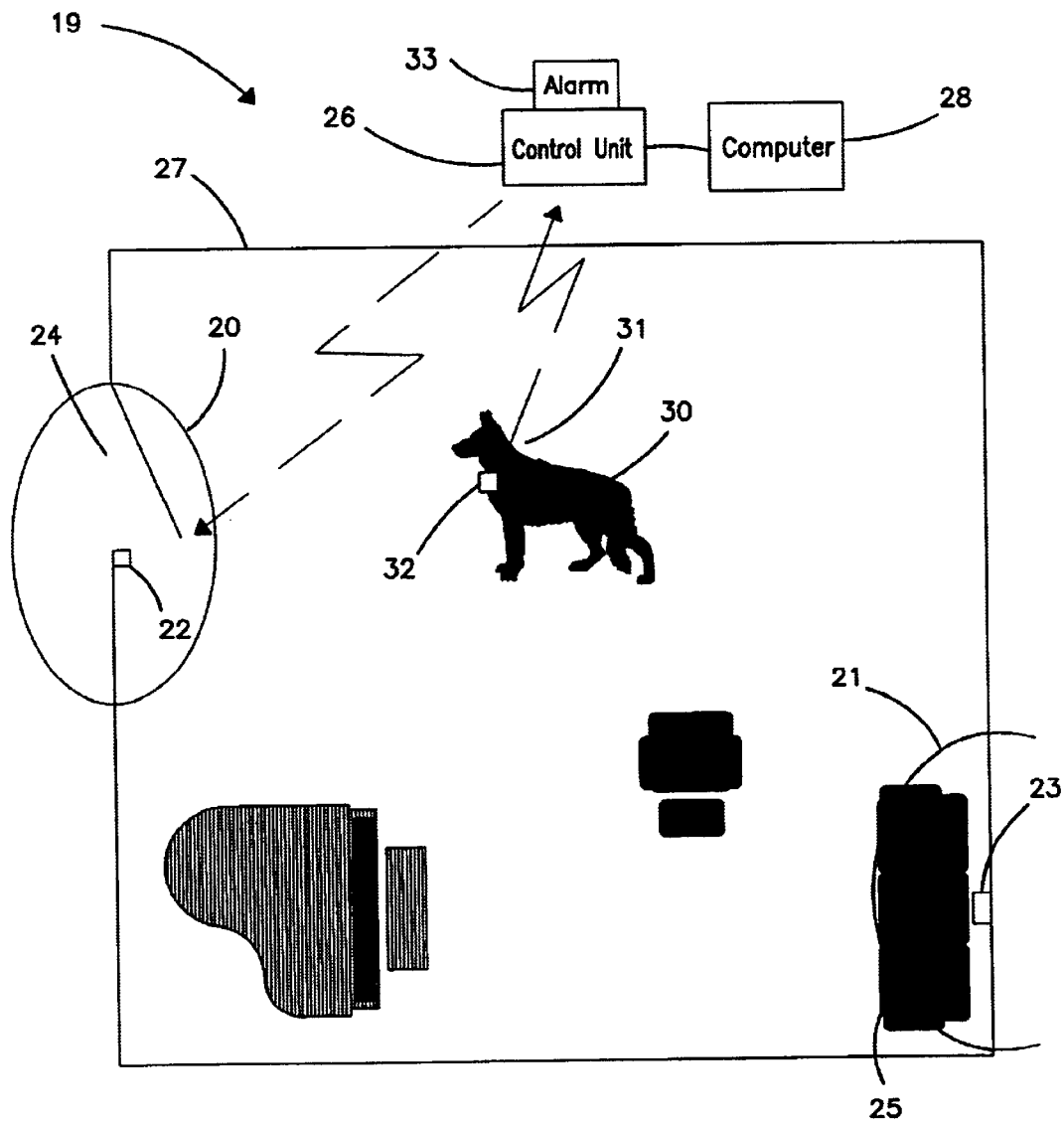
FIG. 1 illustrates an apparatus for providing electronic exclusion of animals according to the principles of the present invention.

Referring now to FIG. 1, which shows an animal control apparatus 19, an exclusion area 20 associated with exclusion unit 22 is located close to a doorway 24 of a room 27. The exclusion area 20 is an area around the exclusion unit 22 which deters the animal from approaching the exclusion unit 22. By positioning the exclusion unit 22 close to the doorway 24, the doorway 24 is included within the exclusion area 20. Thus, the animal 30 is deterred from approaching the doorway 24 and is contained within the room 27.

The exclusion unit 22 is controlled by a control unit 26 which is connected to a computer 28. The control unit 26 may be a stand alone unit, connectable to an external computer, or may be an integral part of the computer, for example a board plugged into one of the extension slots of the computer 28. The following description refers to the first exclusion area 20 and exclusion unit 22, but may be applied equally to a second exclusion area 21 and second exclusion unit 23 positioned so as to deter the animal 30 from approaching, for example, an item of furniture 25. The animal 30 is provided with a portable unit 32. The portable unit 32 is attached to the animal 30 by use of a collar 31 placed around the animal's neck, but may also be attached by use of a belt around the animal's abdomen or leg, or attached to the animal in a similar way.

The exclusion unit 22 typically produces a modulated magnetic field. The portable unit 32 includes a magnetic sensor to detect the modulated magnetic field produced by the exclusion unit 22, and is generally sufficiently sensitive to provide a positive detection of the electromagnetic field at a distance ranging from approximately two to six feet from the exclusion unit 22. It is understood that the detection range from the exclusion unit may be larger than six feet. The portable unit 32 includes a radio transmitter which transmits a signal to the control unit 26 indicating that an attempt has been made by the animal 30 to enter a particular exclusion area. If the portable unit 32 or control unit 26 determines that the animal 30 has entered the exclusion area 20, then the control unit 26 may activate an alarm 33 which alerts the owner or guardian of the animal 30 to the animal's intrusion into the exclusion area 20.

The portable unit 32 is provided with a sensor which senses the strength of the electromagnetic field produced by the exclusion unit 22. The strength of the electromagnetic field is determined by the distance from the exclusion unit 22 to the portable unit 32.

Figure 2:
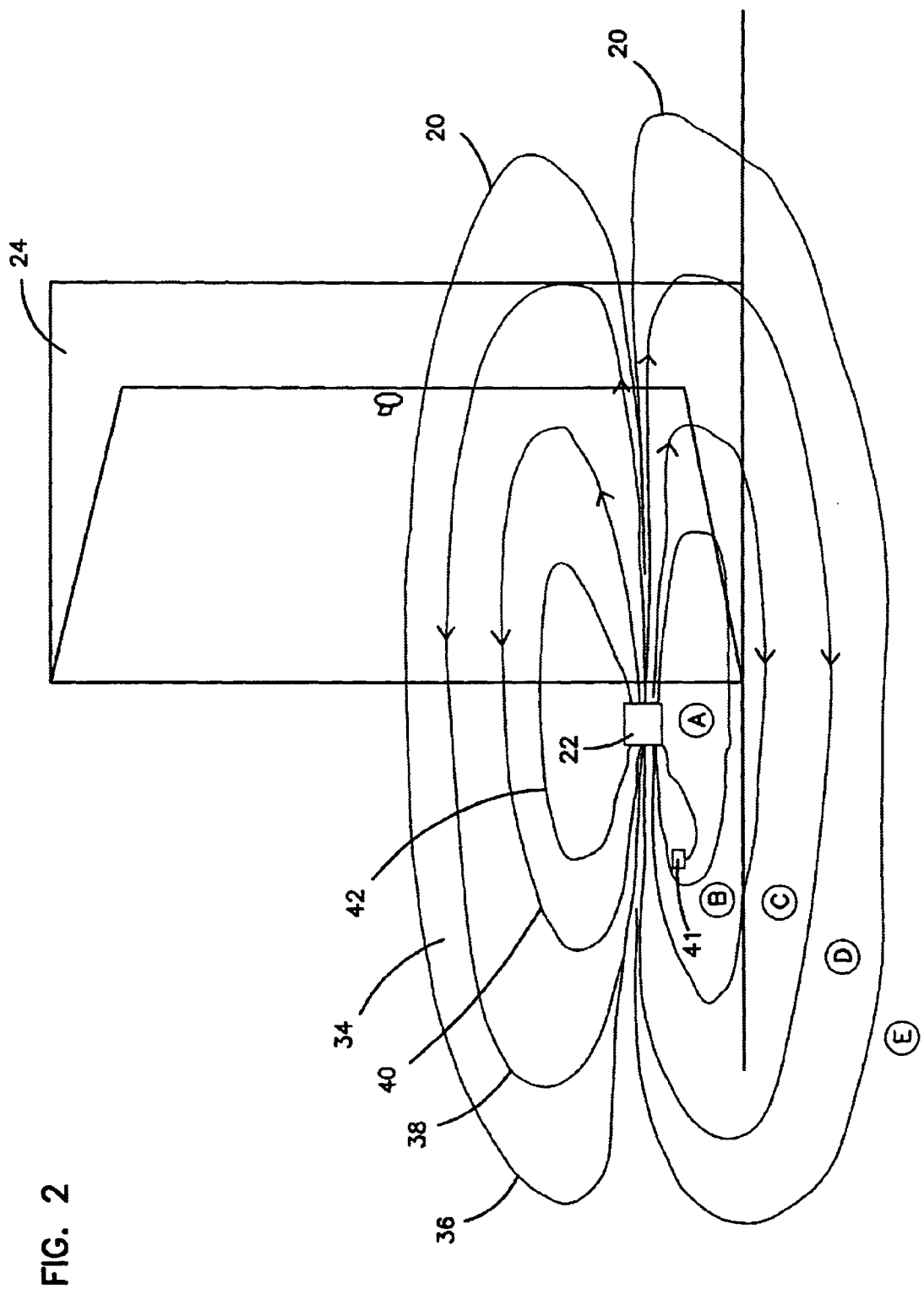
FIG. 2 illustrates a magnetic field around an electronic exclusion apparatus.

FIG. 2 illustrates the formation of the exclusion area 20 by the exclusion unit 22 close to a doorway 24. The exclusion unit 22 is preferably mounted close to the door jamb of the doorway 24, and is powered by household electric power from the wall socket 41. The exclusion unit 22 generates an electromagnetic field 34, preferably using a coil having an air-core or a ferrite-core, or using other radiation antennas. The exclusion unit 22 is at an originating point within the exclusion area 20, and does not peripherally generate an electromagnetic field surrounding an essentially field free region where the animal 30 may be located. The resulting electromagnetic field 34 has a dipole-type profile, and contours of increasing electromagnetic field strength 36, 38, 40 and 42 lie increasingly closer to the exclusion unit 22. It is understood that the shape of the exclusion area 20 is dependent on the source used for generating the electromagnetic field 34 included in the exclusion unit 22. It may be useful, for example in protecting a table, to employ an electromagnetic field 34 which is more circular than the electromagnetic field 34 illustrated. A differently shaped field may be generated, for example, using an antenna having a different configuration, or by including additional elements to shape the field.

Different zones A, B, C, D, and E, marked by respective letters within circles, represent areas of decreasing electromagnetic field strength. Zone E is outside the exclusion area 20. When the animal 30 enters the exclusion area 20, for example by passing from zone E to zone D, the portable unit 32 detects an increase in electromagnetic field strength and transmits a signal, indicative of the electromagnetic field strength relative to the animal's position within the exclusion area 20, to the control unit 26. The control unit 26 responds by selecting an appropriate, selectable level of correction for the animal, typically an audible signal or an electric shock, depending on which zone (A–D) the animal 30 has entered or on the length of time for which it has failed to respond to the applied correction. If the control unit 26 is programmed to exclude the animal 30 from the exclusion area 20, the control unit 26 transmits a correction control signal to the exclusion unit 22. The correction control signal is encoded on the electromagnetic field 34 generated by the exclusion unit 22. The portable unit 32 detects the encoded electromagnetic field 34 and provides correction to the animal 30 in accordance with the received correction signal.

Figure 3:
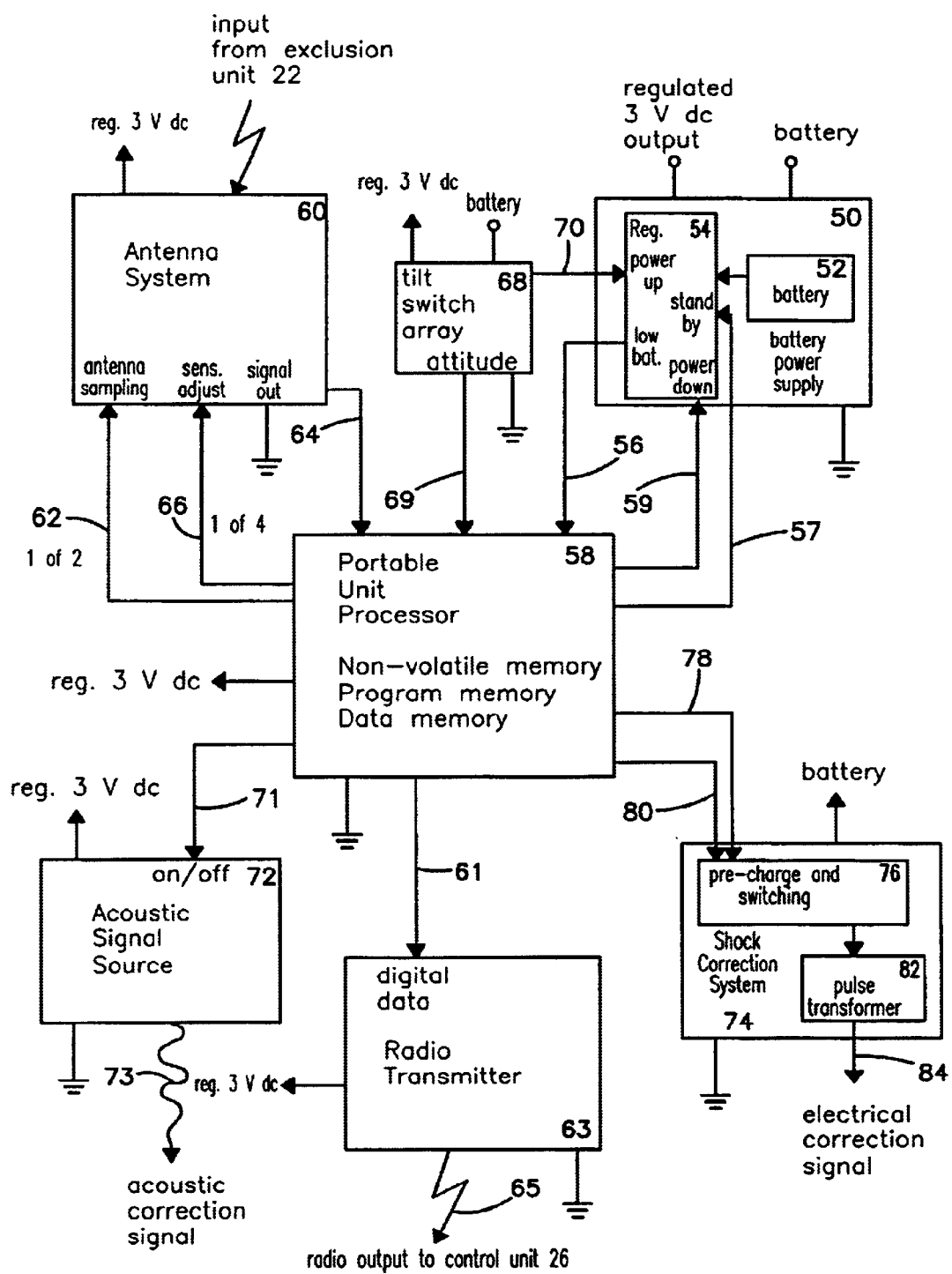
FIG. 3 illustrates a block diagram schematic of a portable unit of an electronic exclusion apparatus.

In FIG. 3, there is illustrated a block diagram of one embodiment of the portable unit 32. A similar embodiment is discussed with reference to FIG. 15, but includes transceiving abilities that the embodiment of FIG. 3 does not provide. Power is applied to the portable unit 32 by the battery power supply 50. The battery power supply 50 includes a battery 52, such as a lithium, coin-shaped battery. A battery 52 of this type advantageously reduces the profile of the portable unit 32 and the period between battery changes. The voltage output from the battery 52 is regulated by a regulator circuit 54, including a regulator such as one from the MICREL 2570 or from the Linear Tech LT 1307 series of regulator chips, so as to give a regulated output of approximately 3 or 3.3 Volts. The regulator circuit 54 ensures that the output from the battery power supply 50 is maintained at approximately 3 or 3.3 Volts, even when the voltage derived from the battery 52 is greater or less than approximately 3 or 3.3 Volts. The regulator circuit 54 detects when the voltage of the battery 50 has fallen below a pre-selected acceptable level, typically around 1 Volt. When such a low battery voltage condition is detected, the regulator circuit 54 directs a low battery voltage signal 56 to a portable unit processor 58. On receiving the low battery voltage signal 56, the portable unit processor 58 transmits a low battery voltage message over the data line 61 to the radio transmitter 63. The radio transmitter 63 then transmits a low battery voltage message to the control unit 26 to alert the user of the low battery voltage condition of the portable unit 32.

Figure 4:
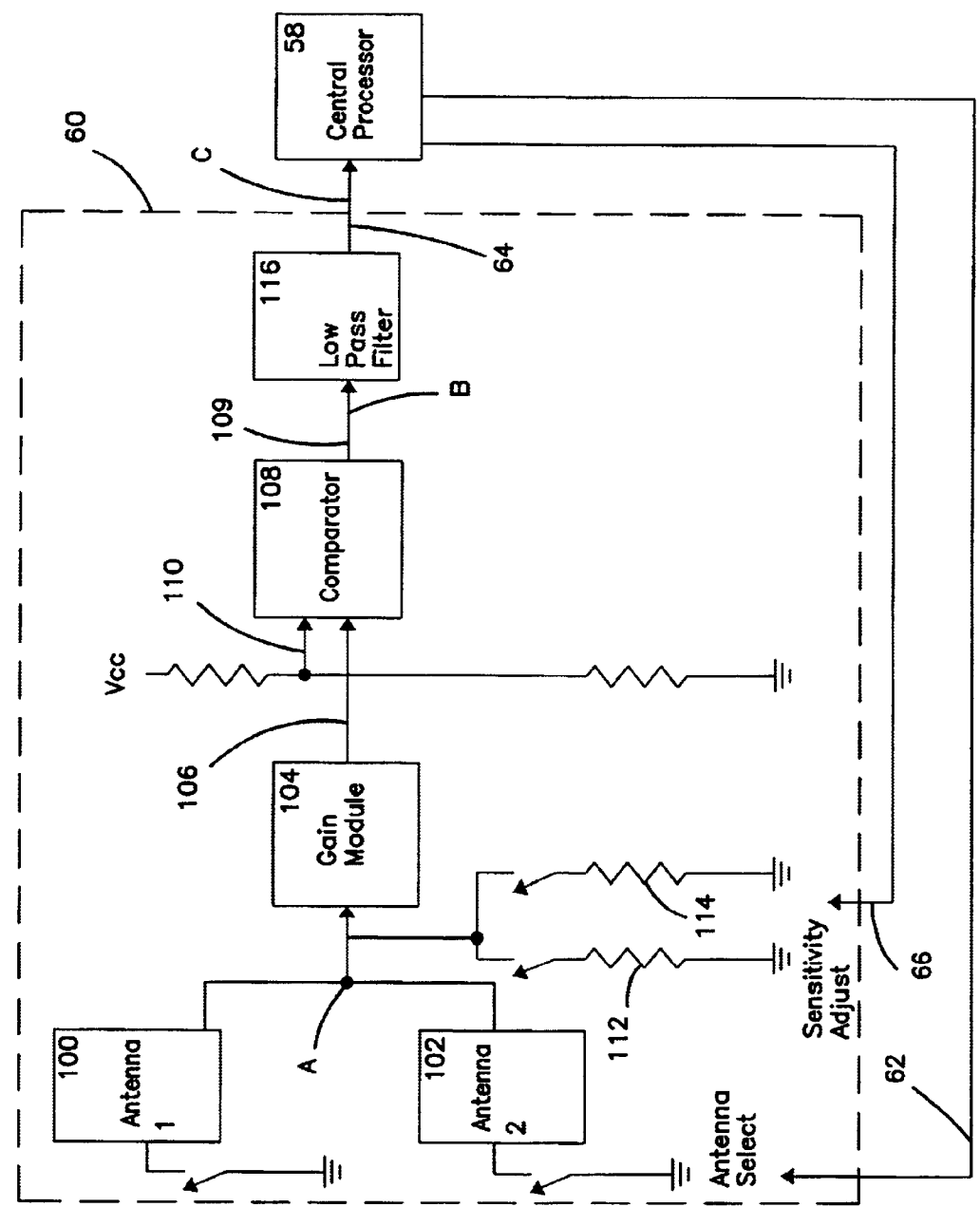
FIG. 4 illustrates a block diagram schematic of an antenna system provided in a portable unit.

The antenna system 60 preferably includes two orthogonal antennas, such as antennas 112 and 114 of FIG. 4, for detecting the electromagnetic field 34 produced by the exclusion unit 22. The portable unit processor 58 transmits an antenna sampling signal 62 to the antenna system 60 to sample the signals received from one of the antennas. If more than two antennas are used, the sampling signal selects one antenna from all the antennas present. The portable unit processor 58 may also adjust the sensitivity of the antenna system through use of a sensitivity adjust signal 66, as is described hereinbelow.

A tilt switch array 68, which may be of the ball bearing type, is provided on the portable unit 32. The tilt switch array 68 serves several functions, including the determination of activity of the animal 30, and directing orientation information to the portable unit processor 58 regarding the orientation of the portable unit 32. Since the tilt switches in the tilt switch array 68 are sensitive to movement, the movement of the animal 30 acts to repeatedly switch the tilt switches in the tilt switch array 68 between on and off states. A power-up signal 70 is fed from the tilt switch array 64 to the regulator circuit 54 in the battery power supply 50 in response to this activity. The regulator circuit 54 powers up the regulated approximately 3 or 3.3 Volt output when activity is detected by the tilt switch array 68. When no animal activity has been detected from the tilt switch array 68 for a timeout period, the portable unit processor 58 provides a no-activity signal 59 to power down the regulated approximately 3 or 3.3 Volt output until the activity signal 70 again signals when the tilt switch array 68 senses animal activity and powers up the approximately 3 or 3.3 Volt output. Before powering itself down, the portable unit processor 58 sends a notice of power down over the data line 61 to the radio transmitter 63. The radio transmitter 63 then transmits a notice of power down to the control unit 26 so as not to cause a lost animal alarm. As such, this power conservation scheme results in a greatly extended battery life.

An important aspect of the invention is that the control unit 26 may select an appropriate form of correction given to the animal 30 in response to the distance between the animal 30 and the exclusion unit 22. When the portable unit 32 has detected that the animal 30 is approaching the exclusion unit 22, a signal is transmitted from the portable unit 32 to the control unit 26 by the radio transmitter 63. The transmitted signal indicates the distance separating the animal 30 from the exclusion unit 22. The control unit 26 then determines what kind of correction should be applied to the animal 30 according to the separation distance. For example, the correction may be an acoustic signal, a low-level electric shock, or a high-level electric shock. Once the control unit 26 has selected the applicable correction, the control unit 26 then directs the exclusion unit 22 to generate coded pulses on the electromagnetic field 34 which are received by the antenna system 60 of the portable unit 32. The coded pulses include instructions for correcting the animal 30.

For example, if the instructions received from the control unit 26 indicate that the animal 30 should be corrected by an acoustic alarm, then an alarm signal 71 is directed to an acoustic signal device 72. The acoustic signal device 72 may be an intermittent buzzer, operating at audible frequencies or at ultra-sonic frequencies particularly detectable by the animal 30. If the instructions received from the control unit 26 indicate that the animal 30 should be corrected by the application of an electric shock, then the portable unit processor 58 activates the shock correction system 74. The shock correction system 74 generates an electrical shock signal 84 which is typically applied to the animal by a pair of contact pins. The shock correction system 74 includes a capacitive precharge and switching circuit 76 which is charged according to a precharge signal 78. After a predetermined charging time, the portable unit processor 58 directs a discharge signal 80 to the capacitive precharge and switching circuit 76. The capacitively stored energy is preferably discharged through a pulse transformer 82 to generate an electrical shock signal 84 which is applied to the animal 30. The voltage generated by the capacitive precharge circuit 76 is generally around 3 or 3.3 Volts, and the pulse transformer typically increases the voltage of the electrical shock signal 84 to approximately 1,000 Volts. The duration of the charging cycle determines the amount of charge capacitively stored in the capacitive precharge and switching circuit 76. The intensity of the electrical shock signal 84 applied to the animal 30 may be controlled by selected variation of the duration of the precharge cycle according to instructions received from the control unit 26.

Figure 10:
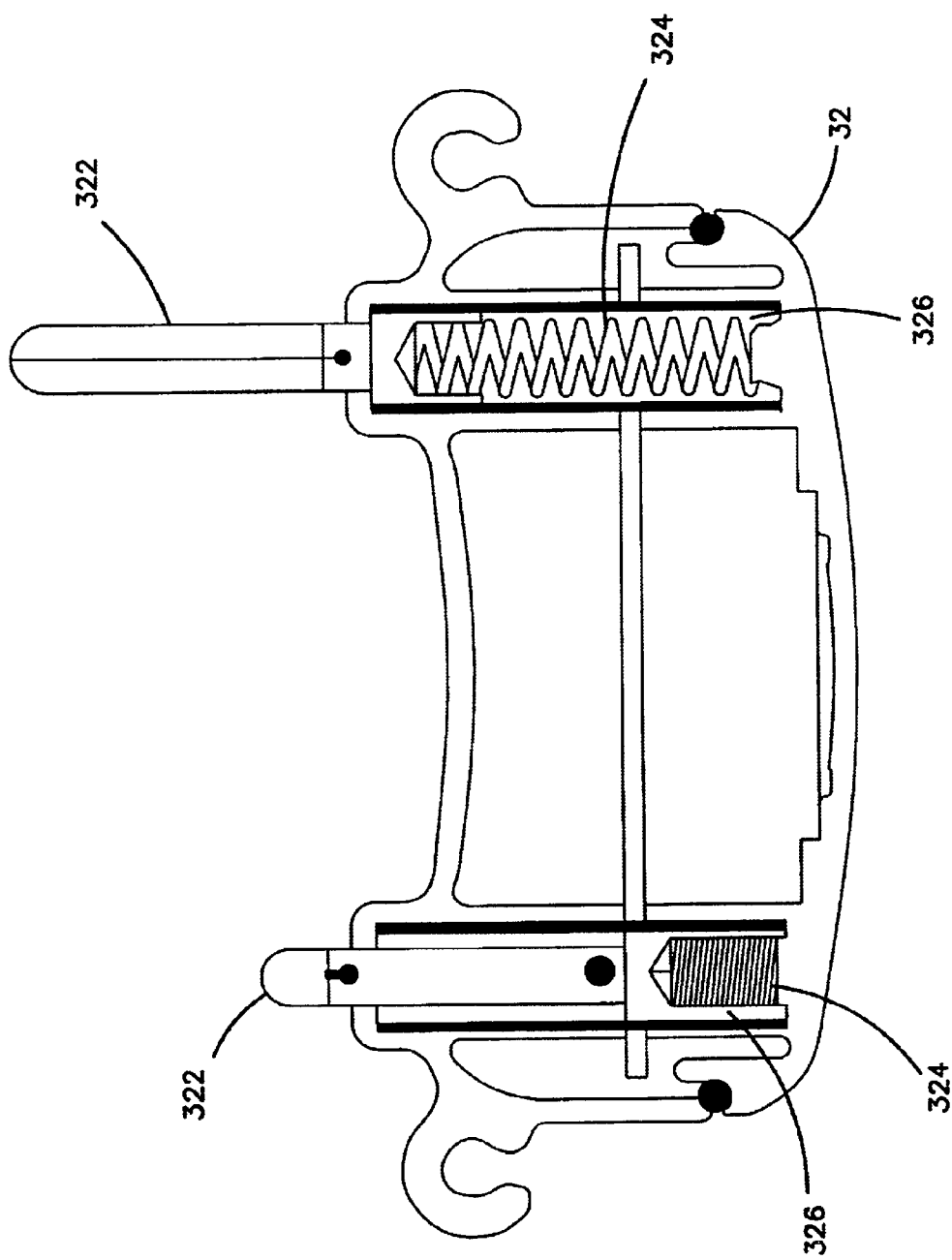
FIG. 10 illustrates a cross-section through a portable unit.
Figure 13:
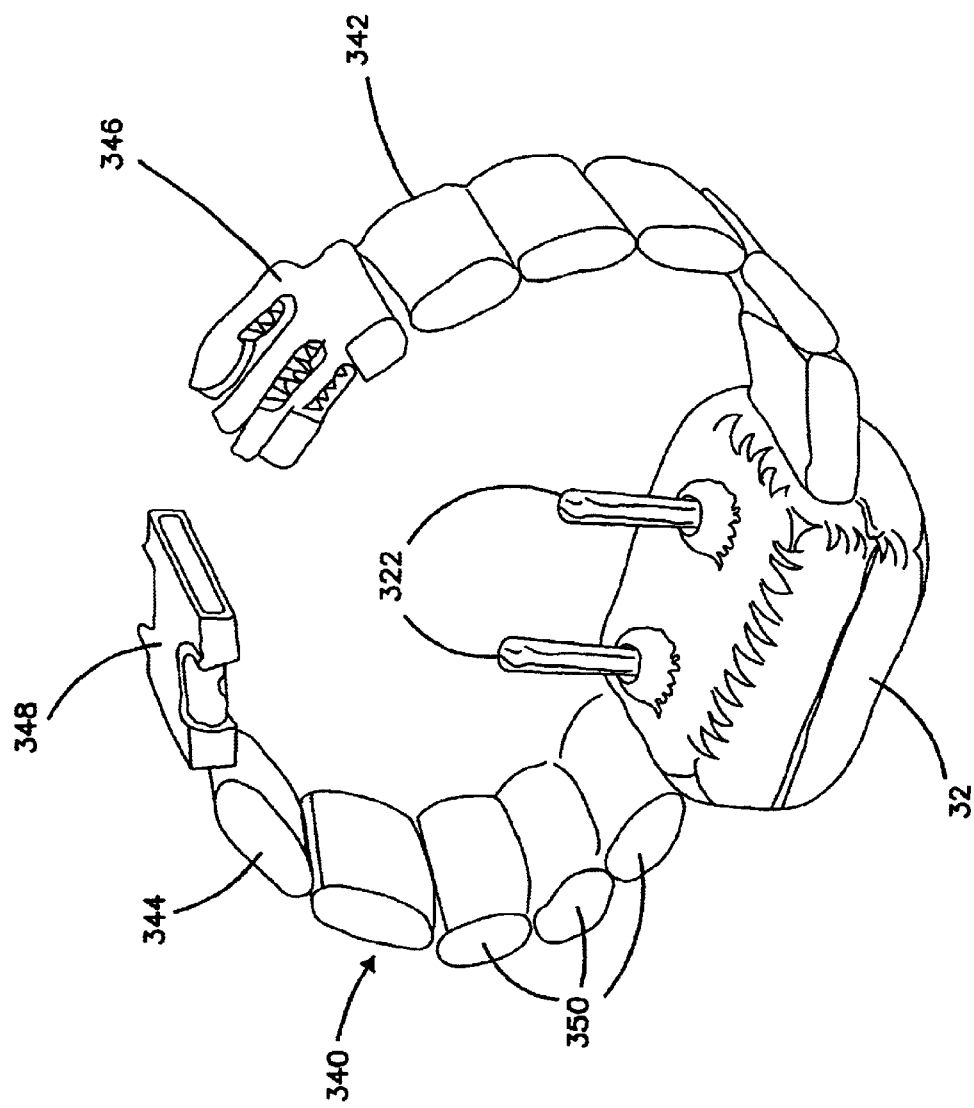
FIG. 13 illustrates a segmented collar for a portable unit.

With refernce to FIGS. 10 and 13, the electrical shock is preferably applied to the animal 30 by a pair of sprung contact pins 322 extending from the portable unit 32. FIG. 10 illustrates a cross section through a typical portable unit 32 where the sprung pins 322 are backed by springs 324 in a well 326 (one contact pin 322 is shown fully extended and the other fully retracted). The use of springs 324 to spring-load the contact pins 322 advantageously allows the sprung contact pins 322 to adjust in length automatically in response to the thickness of the animal's fur or hair. The contact pins 322 may then form an electrical contact with the animal's skin sufficient to close the electrical circuit. The compressibility of the springs 324 is preferably selected to minimize discomfort to the animal 30. The use of spring-loaded contact pins 322 obviates requiring the user to manually replace one pin set with another in order to adapt the pin length to the thickness of the animal's fur or hair, as is the case in conventional devices. The spring-loaded contact pins 322 advantageously maintain consistent contact with the animal 30 when the animal 30 is in motion, or when the animal's body swells during periods of high activity.

An important feature of the present invention is that the control unit 26 is programmed to provide the level of correction to be applied to the animal 30 in response to changes in the separation distance between the animal 30 and the exclusion unit 22. As the animal 30 moves closer to the exclusion unit 22, the level of correction may be increased. For example, the first level of correction applied to the animal on entering zone D may be a soft acoustic correction signal 73 generated by the acoustic signal device 72. As the animal moves closer to the exclusion unit 22, for example into zone C, then a low-level electrical shock signal 84 may be applied by the shock correction system 74. An increased electrical shock signal 84 may be applied as the animal 30 approaches closer to the exclusion unit 22, for example from zone C to zone B. Alternative correction strategies may be programmed into the control unit 26. For example, if the exclusion unit 22 is protecting a piece of furniture, then it may be preferable to supply a low-level acoustic warning when the animal 30 enters zone D, a higher level acoustic warning when the animal 30 enters zone C, a low-level electric shock when the animal 30 enters zone B, and a higher level electric shock when the animal 30 enters zone A. Alternatively, only acoustic correction may be applied to the animal 30, irrespective of how close the animal 30 approaches the exclusion unit 22. Additionally, both an electrical shock signal 84 and an acoustic signal 73 may be applied to the animal 30 simultaneously. This combination may be used for training the animal 30 to respond to an acoustic signal 73.

If the animal 30 approaches within a certain distance of the exclusion unit 22 so as only to initiate an acoustic alarm, but does not retreat from the exclusion unit 22 within an acceptable time, then the control unit 26 may be programmed to direct the portable unit 32 to apply an increased level of correction, such as a low-level electrical shock until the animal 30 retreats from the exclusion area 20.

The portable unit processor 58 is preferably adapted to control the battery power supply 50 so as to reduce the possibility of radio frequency (RF) interference from the regulator circuit 54 interfering with the electromagnetic field 34 detected by the antennas 100 and 102 in the antenna system 60. The portable unit processor 58 turns the regulator circuit 54 off by the regulator standby signal 57 so as to reduce RF interference. Turning the regulator circuit 54 off results in a loss of regulated voltage applied to the other elements of the portable unit 32. By maintaining a storage capacitor across the output of the battery power supply 50 in the portable unit 32, the regulator circuit 54 may be periodically turned off, for example around 2 milli-seconds at a time. After a 2 milli-second time off interval, the regulator circuit 54 is reactivated by the regulator standby line 57 and a approximately 3 or 3.3-Volt regulated signal re-applied to each of the elements in the portable unit 32, so as to recharge the storage capacitors.

FIG. 4 illustrates a block schematic diagram of the antenna system 60. Two antennas 100 and 102 are illustrated, but three or more may also be used. Antenna one 100 and antenna two 102 are preferably oriented so that their respective directions of maximum sensitivity are orthogonal, and that the plane defined by the directions of maximum sensitivity for each antenna is a horizontal plane extending around the animal 30.

Each of the antennas is selected in sequence by the antenna select signal 62 received from the portable unit processor 58. The output A from the antenna thus selected is directed through a signal attenuator formed by switchable resistors 112 and 114 coupled to a gain module 104. The gain module 104 typically includes an operational amplifier operating in the linear region. The output 106 from the gain module 104 is directed to a comparator 108 which compares the gain module output 106 with a reference signal voltage 110. The sensitivity adjust signal 66 selects programmable resistors 112 and 114 in the signal attenuator so as to vary the amplitude of the input to the gain module 104. The use of two programmable resistors 112 and 114 results in four sensitivity settings for the gain module output, resulting in a comparator 108 output 109 indicative of the levels of electromagnetic field shown as 36, 38, 40 and 42 around the exclusion unit 22. When the comparator output 109 is high, even though the programmable resistors 112 and 114 are switched so as to produce the smallest gain module output 106, then the animal has entered zone A, closest to the exclusion unit 22. If, on the other hand, there is a zero output signal 109 from the comparator 108 for all levels of gain module output signal 106, the animal 30 is assumed to be outside the exclusion area 20, i.e. in zone E. An alternative approach to determining in which zone the animal 30 is located is to maintain the input to the gain module 104 with a single sensitivity and to sample different reference voltages 110. In another alternative approach, the programmable signal attenuator, including the switchable resistors 112 and 114, and the comparator 108 may be included with the portable unit processor 58 in a single chip.

The comparator output 109 is directed to a low pass filter 116. The output from the low pass filter 116 is directed to the portable unit processor 58 as the data out signal 64.

Once the portable unit processor 58 has processed the data out signal 64 from the antenna system 60, the appropriate information data packet is transferred to the radio transmitter 61 for transmission to the control unit 26. The information packet transmitted by the radio transmitter 61 typically includes a code identifying which portable unit 32 transmitted the signal and data indicating in which zone the portable unit 32 is currently located.

Figure 5:
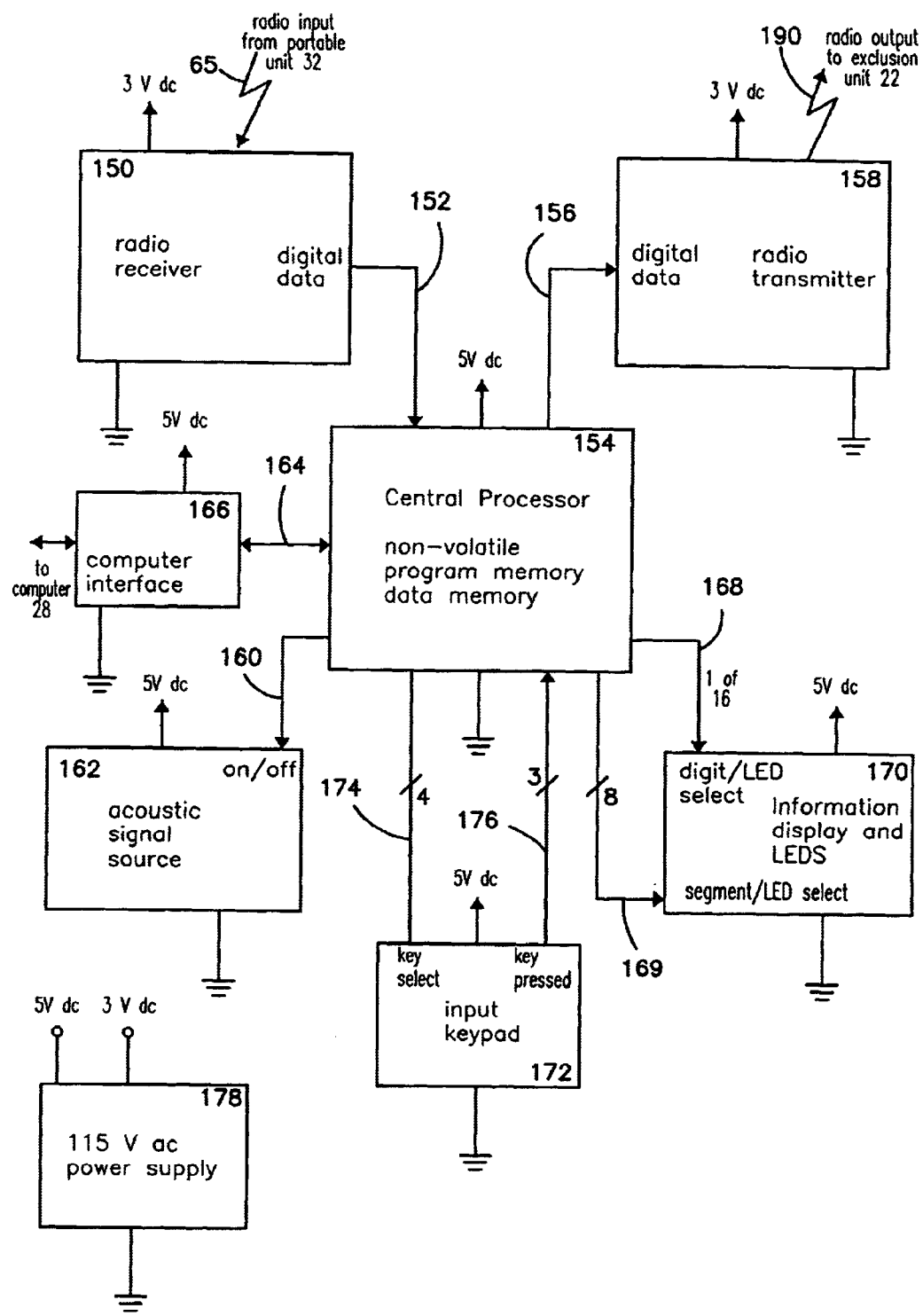
FIG. 5 illustrates a block diagram schematic of a controller unit of an electronic exclusion apparatus.

A block diagram schematic of the control unit 26 is illustrated in FIG. 5. The radio signals 65 transmitted by the radio transmitter 63 in the portable unit 32 are received by the radio receiver 150 in the control unit 26. The radio signals are decoded and the data transferred via the data input line 152 to the central processor 154.

The central processor 154 includes non-volatile memory, program memory, and data memory, and controls operating functions of the animal control apparatus 19.

When the portable unit 32 determines that the animal 30 has entered one of the zones A–D in the exclusion unit 22, the portable unit 32 identifies which zone the animal 30 is located in and transmitting identification codes to the control unit 26 identifying which exclusion unit 22 generated the electromagnetic field 34 which was detected and the portable unit 32 transmitting the message. The central processor 154 in the control unit 26 includes program memory so that the user may program the animal control apparatus 19 to provide different levels of correction according to which zone A–D the animal 30 has entered or, alternatively, to provide no correction at all for the animal 30 on entering the exclusion area 20. When the central processor 154 receives the zone information from the portable unit 32, the central processor 154 transmits a correction instruction appropriate to the zone currently occupied by the animal 30. The correction instruction is directed to the radio transmitter 158 via the data output line 156. The radio transmitter 158 transmits the instructions to the exclusion unit 22 which then encodes correction commands modulated on the electromagnetic field 34, as discussed hereinbelow. After the portable unit 32 receives and decodes these correction commands, the desired correction is applied to the animal 30.

The control unit 26 may control the operation of a number of exclusion units 22 and 23, allowing the user to control the movement of one or more animals by employing a number of exclusion areas 20 and 21. Thus, the user may position exclusion units 22 at several doorways through the house so as to allow the animal 30 to range within several rooms.

If the radio transmitter 63 of the portable unit 32 transmits a low battery voltage signal to the control unit 26, the central processor 154 may warn the user of the low battery condition by directing a low battery voltage signal to the information display 170 through one of the LED select lines 168 and 169.

The central processor 154 monitors the distance between the animal 30 and the exclusion unit 22 by monitoring which zone is occupied by the animal 30. The central processor 154 may be programmed to increase the level of correction to the animal 30 if the animal 30 does not move away from the exclusion unit 22 in a timely manner, for example within about 3–5 seconds of correction starting. Increasing the level of correction may include changing the sound of the acoustic signal, changing from an acoustic signal to an electrical shock signal, and/or increasing the intensity of the electrical shock signal. Additionally, the central processor 154 may measure the time for the animal 30 to move from one zone to the next and, if it determines that the animal is approaching the exclusion area 20 above a preselected speed, the central processor 154 may apply a level of correction higher than would be applied if the animal 30 were approaching the exclusion area 20 at a lower speed.

The central processor 154 may further be programmed to cease the application of correction if the animal 30 does not respond to the increased level of correction within a certain time, for example approximately 10 seconds, since the animal 30 may be caught in the zone and be unable to move away from the exclusion unit 22. Following a rest period of approximately 10 seconds, correction may then be reapplied for another period of approximately 10 seconds. If the animal 30 still does not move out of the exclusion zone 20, then correction ceases and the central processor 154 may then warn the user that the animal has become caught close to the exclusion unit 22. The user may be warned through one of the acoustical signal source 162, the information display 170, and a warning directed to the computer 28 through the computer interface 166.

The control unit 26 may be used to create an historical log of the encounters of the animal 30 with the exclusion unit 22. This is preferably achieved by connecting the control unit 26 to a computer 28 via the computer interface 166, and transferring information from the central processor 154 to the computer 28 for storage. Such historical information may include the time of an incursion event, the zone which the animal 30 penetrated and the correction strategy employed.

Whenever the portable unit 32 is not in a powered-down mode, it transmits a regular handshake signal to the control unit 26 to confirm that the portable unit 32 is operative. Failure by the control unit 26 to receive a regular handshake signal within a preselected timeout period, and without receiving a power-down notice from the portable unit 32, may result in a warning to the user that the portable unit 32 is faulty, or that the animal 30 is lost.

The pet control apparatus 19 may be used for containing more than one animal at a time, and may be programmed to provide customized levels of correction to a number of animals. The central processor 154 is programmable to determine a level of correction according to the zone the animal 30 enters and which particular portable unit 32 is associated with a specific animal 30.

For example, the central processor 154 may be programmed to provide high levels of correction to a disobedient animal or one which is at an early training stage, so that an electrical shock correction is applied whenever the animal reaches any zone within the exclusion zone 20. The central processor may be programmed to command electrical shocks of increasing intensity as the animal 30 approaches the exclusion unit 22. The central processor 154 may also be programmed to respond differently to a second animal which, for example, is well trained or unable to withstand severe correction. The central processor 154, for example, may be programmed to command only an audible warning to the second animal, irrespective of how closely the second animal approaches the exclusion unit 22. Alternatively, the central processor 154 may be programmed to permit the second animal to pass through a first exclusion zone 20, for example allowing the second animal to move from one room to a second room, while barring a first animal from entering the exclusion zone 20. The central processor 154 may also be programmed to exclude both the first and second animals from a second exclusion area 21 generated by a second exclusion unit 23.

The correction strategy for each animal is updatable by reprogramming the programmable memory in the central processor 154. For example, a young animal being introduced to the animal control system 19 may initially require high levels of correction, but the programmed correction levels may be changed so as to reduce the level of correction necessary to keep the animal within the bounds of the system 19 as the animal 30 becomes trained. In order for the control unit 26 to determine which animal of a number of animals is approaching the exclusion unit 22, each portable unit 32 is provided with a unique identifying code which is transmitted to the central processor 154. The control unit 26 is thus able to establish which animal 30 approaches the exclusion unit 22.

An input keypad 172 is provided to facilitate programming of the central processor 154 by the user. The input keypad 172 is connected to the central processor via key select lines 174 and key pressed lines 176. A user may employ the input keypad 172 for entering such information as, for example, the levels of correction associated with each portable unit 32 for each zone, or the length of time that correction is applied to the animal 30 in a single zone before increasing to a next level of correction, or ceasing correction altogether.

The computer interface 166 permits connection of the pet control apparatus 19 to a computer 28 for remote control and monitoring of the pet control apparatus 19 and for logging activity of the animal 30. For example, user-friendly control software may be provided on the computer 28 to allow the user to remotely program the control unit 26, rather than using the input keypad 172. Monitoring software provided on the computer 28 may allow the user to record the activity of the animal 30, including periods of inactivity and incursions to the exclusion zones 20 and 21. The monitoring software may also allow an automatic alarm signal to be sent via telephone line to a remote location when specific events occur, such as loss of contact with a portable unit 32.

The control unit 26 is provided with a power supply 178 to provide power to all the control unit's components at appropriate voltage levels.

The control unit 26 may be configured to catch certain information, such as a low battery warning or a missing portable unit 32, so that such information is not lost in the event that power to the control unit 26 is shut off.

Figure 6:
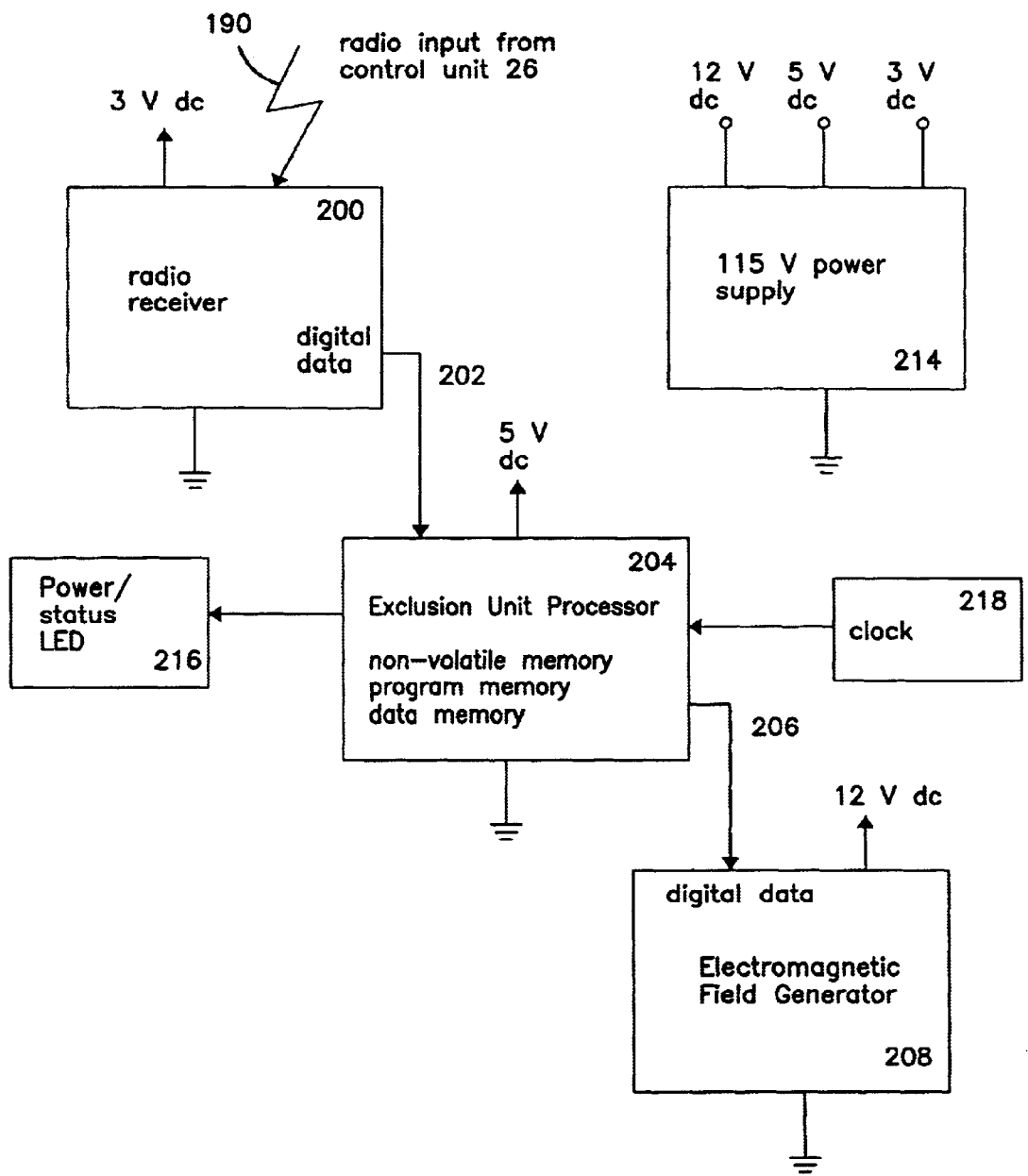
FIG. 6 illustrates a block diagram schematic of an exclusion unit of an electronic exclusion apparatus.

FIG. 6 illustrates a block diagram schematic of the exclusion unit 22. A radio receiver 200 receives control signals 190 transmitted from the control unit 26. The received control signals are directed on control signal line 202 to the exclusion unit processor 204 where the received control signals are processed. After processing, the exclusion unit processor 204 directs control signals 206 to the electromagnetic field generator 208 which produces the electromagnetic field 34.

The exclusion unit 22 is provided with a power supply 214 which preferably generates three separate DC voltage levels. The approximately 3 Volt DC level is used for powering the radio receiver 200. The 5 Volt DC level is used in powering the central processor 204. The electromagnetic field generator 208 is typically powered at a 12 Volt DC level. A power/status LED display 216 may indicate the present power status, for example whether the power unit is functioning normally or to indicate that there is an exclusion unit processor 204 fault, or that there is no power.

Figure 7:
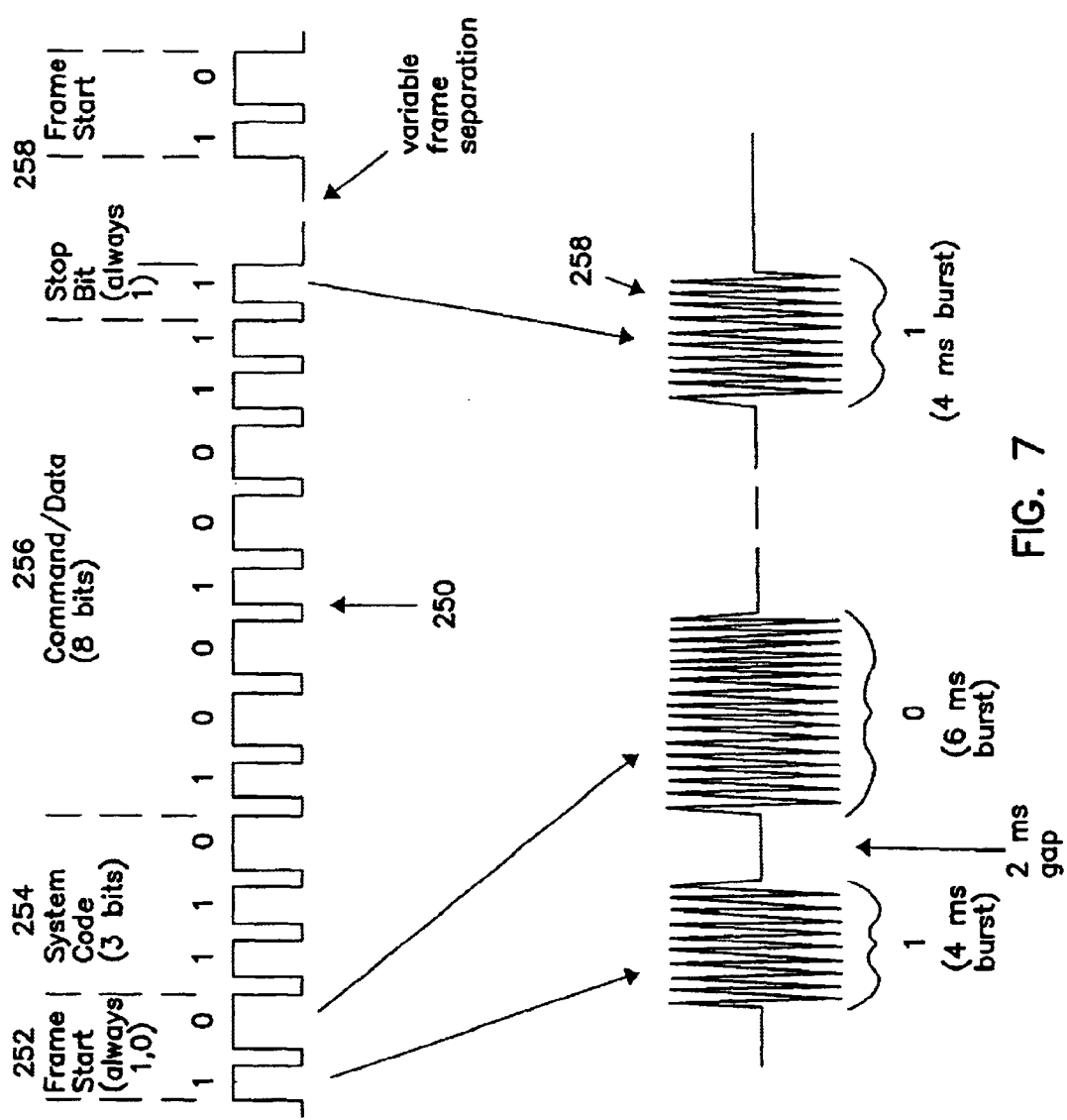
FIG. 7 illustrates waveforms generated by an exclusion unit.

The modulated electromagnetic field 34 generated by the exclusion unit 22 and detected by the portable unit 32 is discussed with reference to FIGS. 7 and 8A–8B. The electromagnetic field 34 is time-encoded with information, such as data or commands, from the control unit 26.

The following discussion describes, an approach in accordance with one embodiment, to modulating the electromagnetic field 34 for information transfer from the control unit 26 to the portable unit 32, although other approaches may be employed. FIG. 7 illustrates the signal transmitted by the exclusion unit 22. The signal includes a frame 250, where the frame is a binary word having four distinct components. The first component is the frame start 252 which includes a "1" and a "0". The second component is the system code, typically comprising three bits, and which indicates a code number related to the control unit 26. The system code 254 is used, for example, to distinguish between different pet control systems operating in adjacent apartments. Following the system code 254 is the command data component 256, typically comprising 8 bits. The command data component 256 may include a header indicating which portable unit 32 out of a plurality of portable units the following command is directed to. The remainder of the command data component 256 includes an identification of which exclusion unit 22 out of a number of exclusion units is transmitting the frame 250, and the instructions for the particular portable unit 32, such as correction commands. The final component of the frame is stop bit 258, which is a "1" followed by a variable dormant period.

The digits in the binary frame 250 are produced by burst width modulation of electromagnetic field reversals having a period of approximately 10 KHz. For example, a "1" may typically be represented by a 4 millisecond burst at 10 KHz, and "0" may typically be represented by a 6 millisecond burst at 10 KHz. The standard separation between bits is 2 milliseconds. The length of the frame 250 can vary, depending on the number of zeros present in the frame 250. The separation between adjacent frames may be varied so that the time lapse between frame starts is constant from one frame to the next. It is understood that the frequency of the bursts may be at frequencies other than 10 KHz.

Figure 8A:
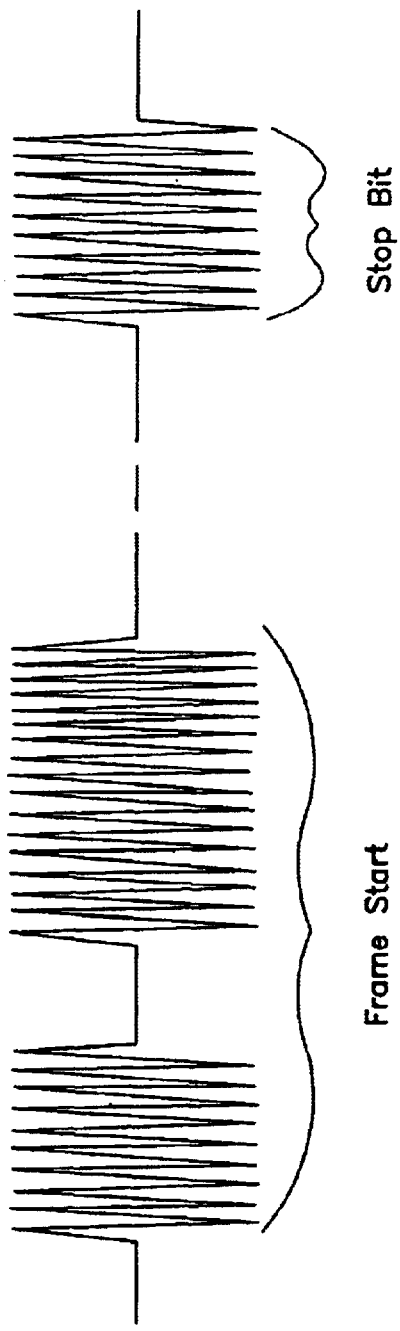
FIGS. 8A–8B illustrate waveforms detected and analyzed by a portable unit.
Figure 8B:
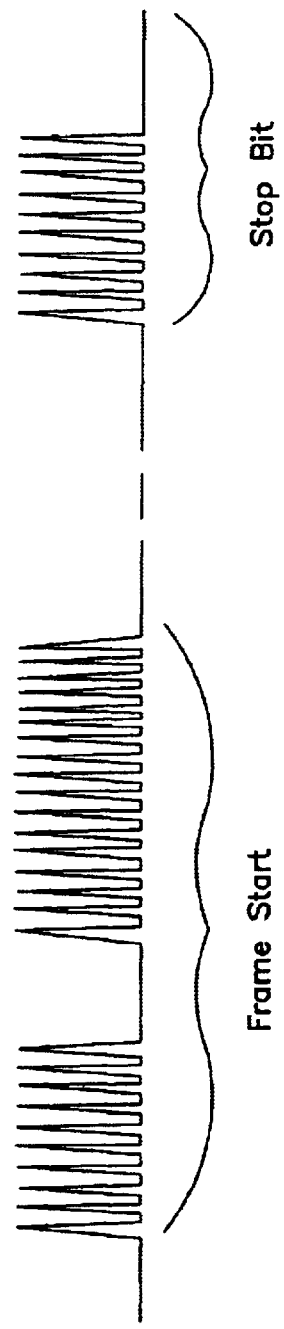

FIG. 8A illustrates a portion of the signal received by one of the antennas 100 and 102, as would be detected at position A in FIG. 4. FIG. 8B shows the same signal once it has been transmitted through the comparator 108, at point B. The comparator 108 produces a logic high whenever the incoming signal is above the reference signal voltage 110. The signal of FIG. 8B is then passed through a low pass filter to remove the 10 KHz carrier frequency, and is decoded by the portable unit processor 58. Changing the sensitivity in terminals 112 and 114 results in the signal shown in FIG. 8B growing or shrinking in amplitude. If the animal 30 is sufficiently far away and does not register in a particular zone, the signal in FIG. 8B is flat (zero level).

Figure 9:
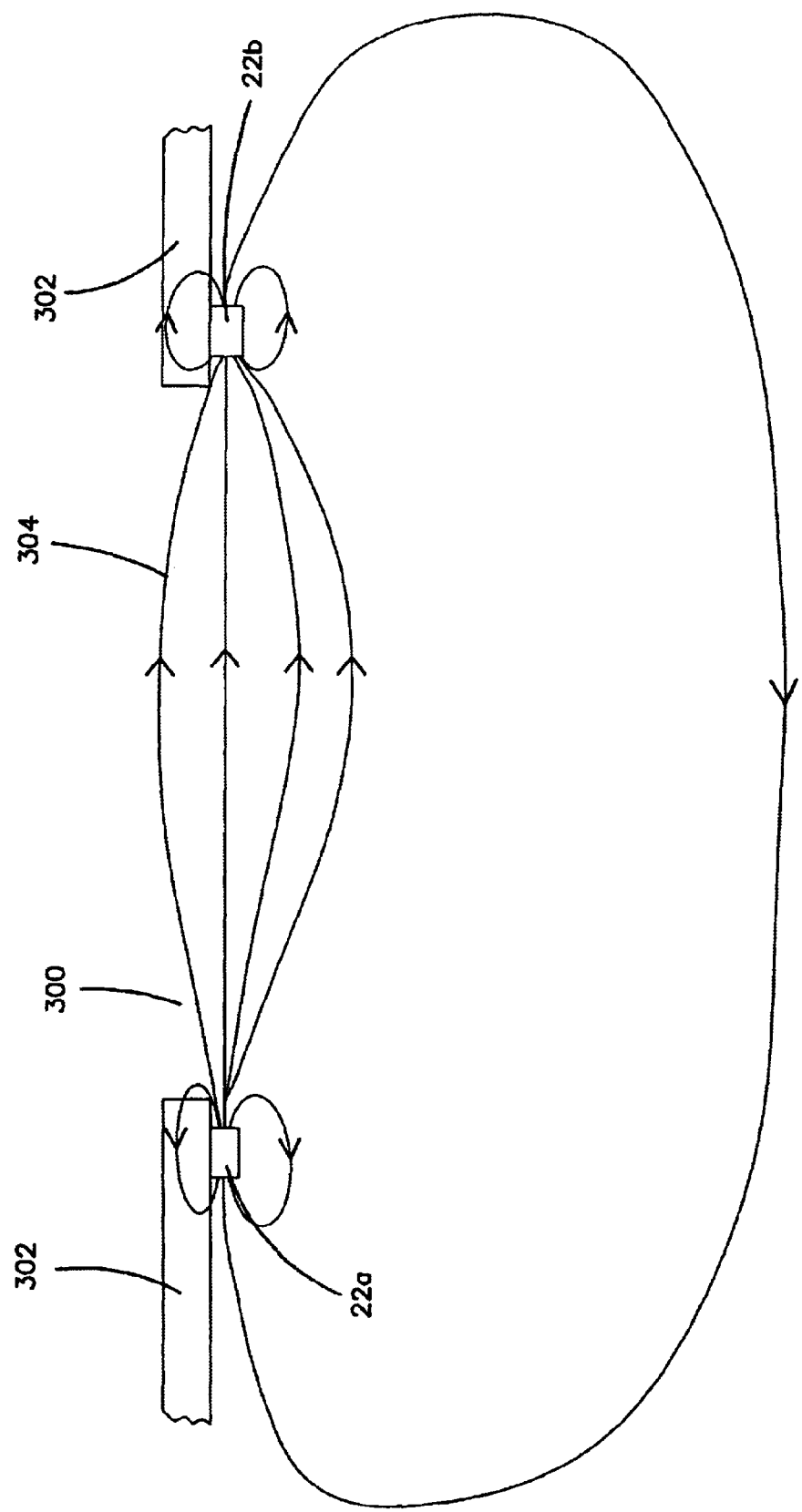
FIG. 9 illustrates two exclusion units operating in tandem.

With reference to FIG. 9, two exclusion units, 22a and 22b, may be used in combination to provide an exclusion area across a wide opening, where a single exclusion unit operating alone is not able to provide an exclusion area sufficiently large as to cover the whole opening. Such an opening may be an archway, as is typically found between a living room and a dining room in many houses. The opening 300 is positioned between opposing wall sections 302. The first exclusion unit 22a is positioned on the left side of the opening 300 and the second exclusion unit 22b is positioned on the right side of the opening 300. The electromagnetic fields radiated into the opening 300 by the exclusion units 22a and 22b are preferably synchronized to be out of phase with each other by 180°. Thus, as the first exclusion unit 22a radiates a first polarity into the opening 300, the second exclusion unit 22b radiates the opposite polarity into the opening 300. Preferably the two exclusion units 22a and 22b are synchronized to present oppositely polarized electromagnetic fields to each other, so that the combined electromagnetic field 304 reaches across the opening 300 between the two exclusion units 22a and 22b.

The exclusion units 22a and 22b may operate in synchronism where each is provided with a high frequency clock 218, such as a quartz clock, for running the respective exclusion unit processors 204, and by initializing the exclusion units 22a and 22b to operate together. For example, during an initial setup, the exclusion units 22a and 22b may be programmed to operate from the same control signal 190 received from the control unit 26, and for both to generate an electromagnetic signal following, for example, a selected number of cycles of the clock 218 after receipt of the control signal 190. The first exclusion unit 22a may be programmed to generate its electromagnetic signal starting with a first polarity, while the second exclusion unit 22b is programmed to generate its electromagnetic signal starting with the opposite polarity. Such a system relies on the clocks 218 in each exclusion unit 22a and 22b keeping close time so as to commence transmission of each frame 250 in synchronism, and to maintain synchronism throughout the duration of the frame 250. Thus, in such an approach, the clock may be regarded as being a synchronization circuit.

Other schemes for operating the two exclusion units 22a and 22b in synchronism include a master/slave approach, where, for example, exclusion unit 22a operates as a master and the exclusion unit 22b operates as a slave. The electromagnetic signal generated by the slave exclusion unit 22b is thus slaved to the electromagnetic signal generated by the master exclusion unit 22a to ensure synchronism. This approach requires transmission of a synchronization signal from the master exclusion unit 22a to the slave exclusion unit 22b using, for example, a radio transmitter or an infrared transmitter or the electromagnetic signal 34 generated by the master exclusion unit 22a.

Figure 11:
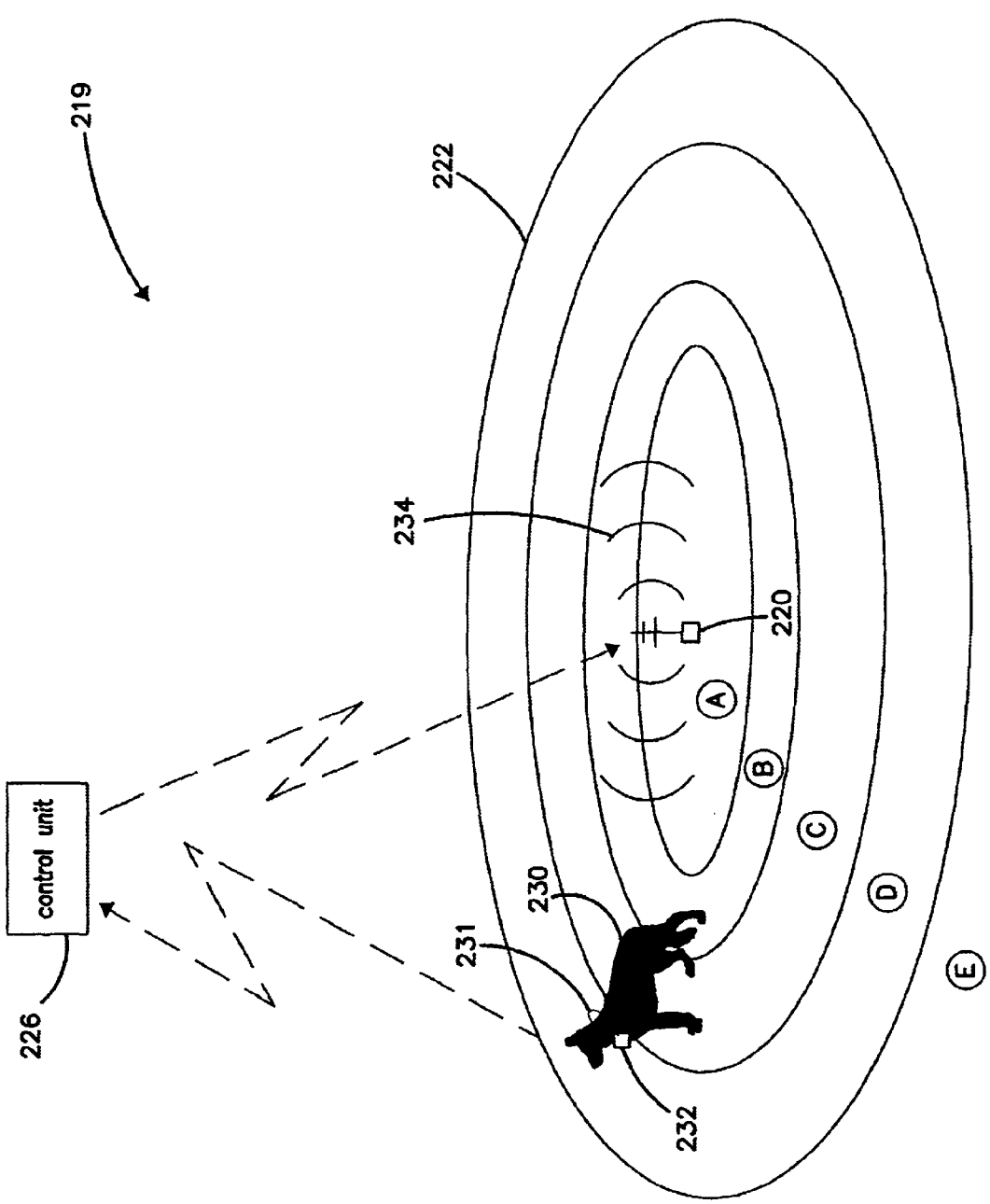
FIG. 11 illustrates an apparatus for providing electronic confinement of animals according to the principles of the present invention.

Another embodiment of the invention, illustrated in FIG. 11, operates on an alternative principle, as discussed in U.S. Pat. No. 5,067,441 which is incorporated herein by reference, where the animal 230 is given increasing correction as it moves away from a transmitter 220, rather than when moving towards a transmitter. This approach results in confining the animal 230 to a confinement area 222, rather than excluding the animal 230 from an exclusion area 22. The animal control system 219 includes a portable unit 232 on the animal, a control unit 226 and a transmitting unit 220. The transmitting unit 220 transmits an electromagnetic signal 234. The strength of the electromagnetic signal 234 received by the portable unit 232 reduces as the animal 230 moves away from the transmitter 220. The portable unit reports the strength of the detected electromagnetic signal 234 to the control unit 226, which is programmed to determine a degree of correction to be applied to the animal 230 in response to the separation between the animal 230 and the transmitter 220. The control unit 226 transmits control information to the transmitter 220, and the control information is then retransmitted by the transmitter 220 on the electromagnetic signals 234 to be detected by the portable unit 232.

The portable unit 232 is similar to that shown in FIGS. 3 and 4, except that the antennas 100 and 102 are tuned to the frequency of the electromagnetic signal 234 transmitted by the transmitter 220. The portable unit may be programmed to provide correction to the animal 230 when no signal 234 is detected, indicating that the animal 230 has left the confinement area 222. Such correction may be terminated if the animal 230 has not returned to the confinement area 222 within a timeout time, since the animal 230 may have become trapped and be unable to re-enter the confinement area 222.

The control unit 226 is similar to that shown in FIG. 5, except that it is programmed to generate a correction signal when the detected electromagnetic signal 234 reduces in amplitude, rather than increases. For example, the control unit 226 may be programmed to provide an acoustic correction signal to the animal 230 when it passes from zone A to zone B, and increasing levels of electric shock correction when it passes from zone B to zone C and from zone C to zone D. The control unit 226 is programmable to control the movement of more than one animal within the confinement area 222 around the transmitter 220, so that different animals may receive different levels of correction for a given separation distance from the transmitter 220. In addition, the control unit 26 may control more than one transmitter 220 in the animal control system 19. Multiple transmitters 220 may have overlapping confinement areas 222, so that the animal 30 may pass from one confinement area 222 to the next, and thus enjoy a greater range of freedom, without receiving correction. Alternatively, multiple confinement areas 222 may be separated so that animals 230 may be confined to their respective confinement areas 222 without being able to pass to a neighboring confinement area 222.

Figure 12:
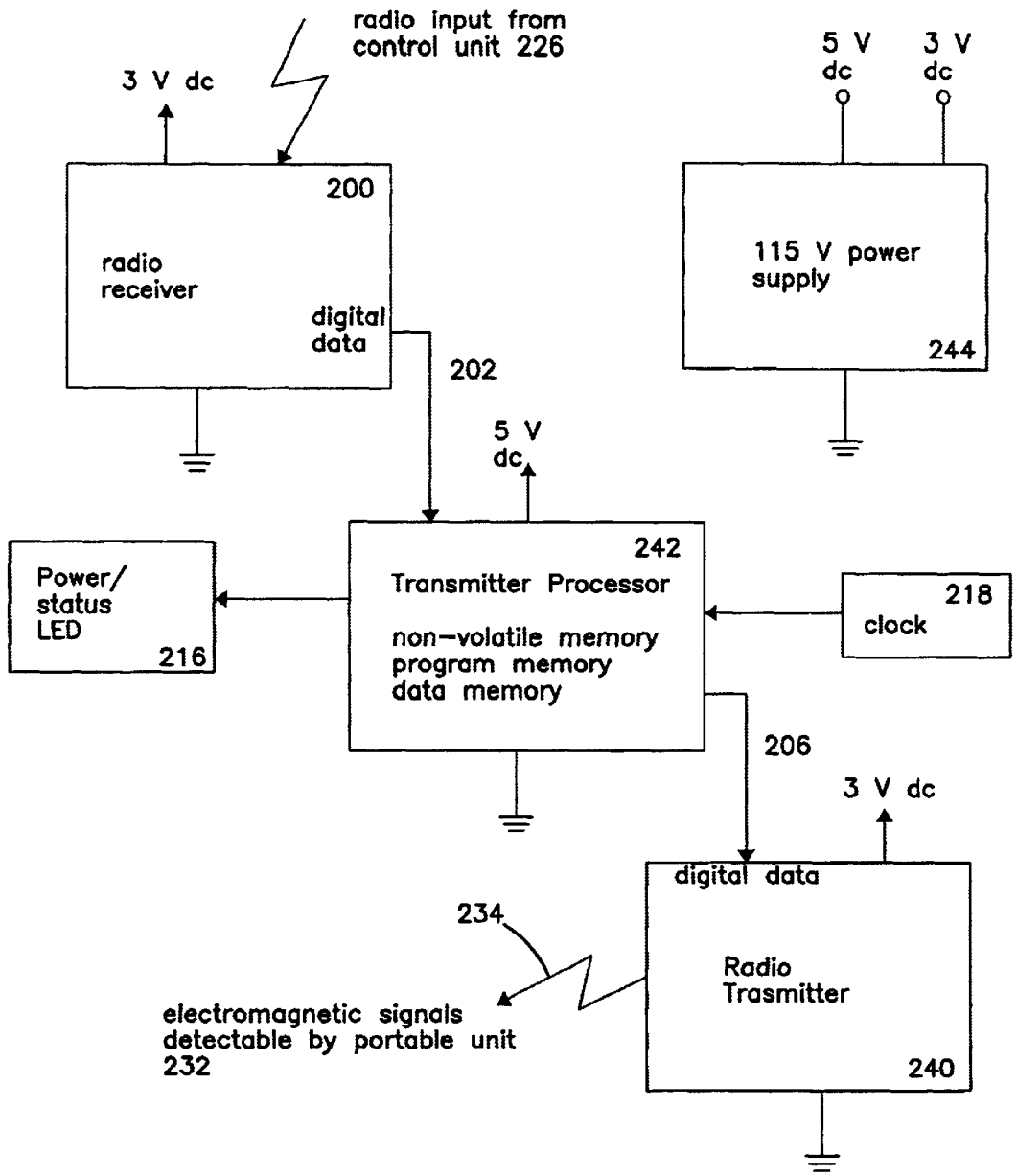
FIG. 12 illustrates a block diagram schematic of a transmitter unit of an electronic confinement apparatus.

The transmitter 220 is illustrated in FIG. 12. The transmitter 220 is related to the exclusion unit 22 illustrated in FIG. 6. A radio receiver 200 receives input transmitted by the control unit 226, and the received digital data 202 thus received are passed to the transmitter processor 242. The transmitter processor decodes the signals received from the control unit 226 and directs the radio transmitter 240 to transmit electromagnetic signals 234 with instructions for the portable unit 232 encoded thereon. The transmitter 220 may be provided with a power/status LED 216 to inform the user of the power status, or useful information. The transmitter processor 242 may be driven by a clock 218, such as a quartz clock. The power supply 244 provides D.C. voltage levels for powering the components of the transmitter 220, for example a 5 V level for the transmitter processor 242 and approximately a 3 V level for powering the radio receiver 200 and the radio transmitter 240.

The portable unit 32 may be attached to the animal 30 by any method which ensures that contact is maintained between the contact pins 322 and the animal's skin. Prior approaches have employed a webbing collar, to which the collar unit is attached, and placing the collar on the animal's neck.

Figure 14:
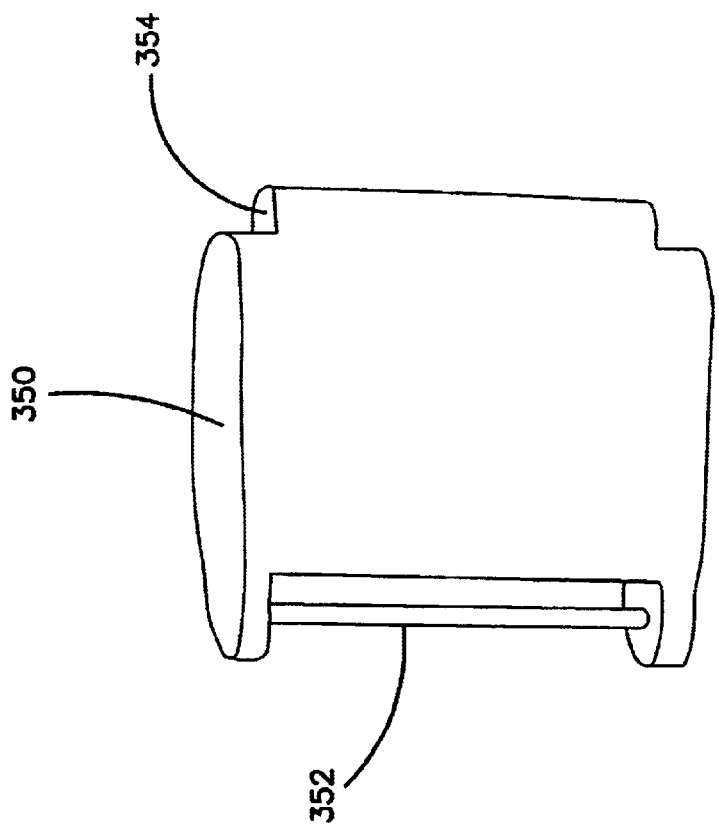
FIG. 14 illustrates a segment for a segmented collar.

An alternative approach, illustrated in FIG. 13 is to use a segmented strap, such as a segmented collar 340 attached to the portable unit 32. The segmented collar 340 may include two parts 342 and 344, where the first part 342 is terminated at one end by an insertion portion 346 and the second part 344 is terminated at one end by a receptacle portion 348. The insertion portion 346 and the receptacle portion 348 may be of a familiar type of plastic buckle. The other ends of the first and second parts 342 are attached to either side of the portable unit 32. Each part 342 and 344 is formed from a series of connectable segments 350 made, for example, from molded plastic. The segments 350 are formed to allow a user to assemble the first and second parts 342 and 344 by fitting one segment 350 into another. This allows the user to adjust the lengths of the first and second parts 342 and 344 to form a close fitting collar 340 when the insertion portion 346 and the receptacle portion 348 are joined. Adjacent segments 350 may "snap fit" together so as to provide hinged attachment therebetween. One approach to forming attachable segments, illustrated in FIG. 14, is to provide a segment 350 with a bar 352 along a portion of one side and a hooked portion 354 along a complementary portion of the other side. The hooked portion 354 of a first segment 350 may snappingly fit over the bar of an adjacent segment 350 so as to provide hinged attachment between adjacent segments 350. Alternatively, the first and second parts 342, 344 may be of fixed length and adjustments may be made by adding segments 350 to either or both the insertion portion 346 and receptable portion 348.

A segmented collar 340 of this sort advantageously provides support to the maintain the portable unit 32 in position and orientation against the animal 30 so as to maintain electrical contact between the contact pins 322 and the animal's skin. The segmented collar 340 also provides the user with a wide range of adjustment in collar length to accommodate a wide range of animal sizes. The segmented collar may also be used with the portable unit 232. It is understood that such a segmented strap may be used to attach a portable unit to a portion of the animal 230 other than its neck, such as a leg.

The following paragraph describes some alternative methods of accomplishing the same objects of the present invention. The portable unit 32 may be adapted to operate autonomously, without interacting with a control unit 26. In such a case, the exclusion unit 22 would be adapted to produce a electromagnetic field 34 from which the portable unit 32 would be able to provide an appropriate correction. The portable unit 32 could be programmable so as to store information regarding, for example, which level of correction is desired for each zone (A–D) in the exclusion zone 20.

The comparator 108 may be provided with a different number of reference signal voltage levels, for example 8, thus permitting detection of the animal in 8 different zones, rather than 4.

The information transmitted from the control unit 26 to the portable unit 32 could be encoded using a protocol different from the one described with reference to FIGS. 7 and 8A–8B. For example, a pulse position modulation technique could be used, rather than pulse width modulation. The frame could be configured to include more bits for carrying more information. Also, bidirectional radio communications could take place between the control unit 26 and the portable unit 32, in which case the exclusion unit 22 could generate unencoded electromagnetic signals 34.

Figure 15:
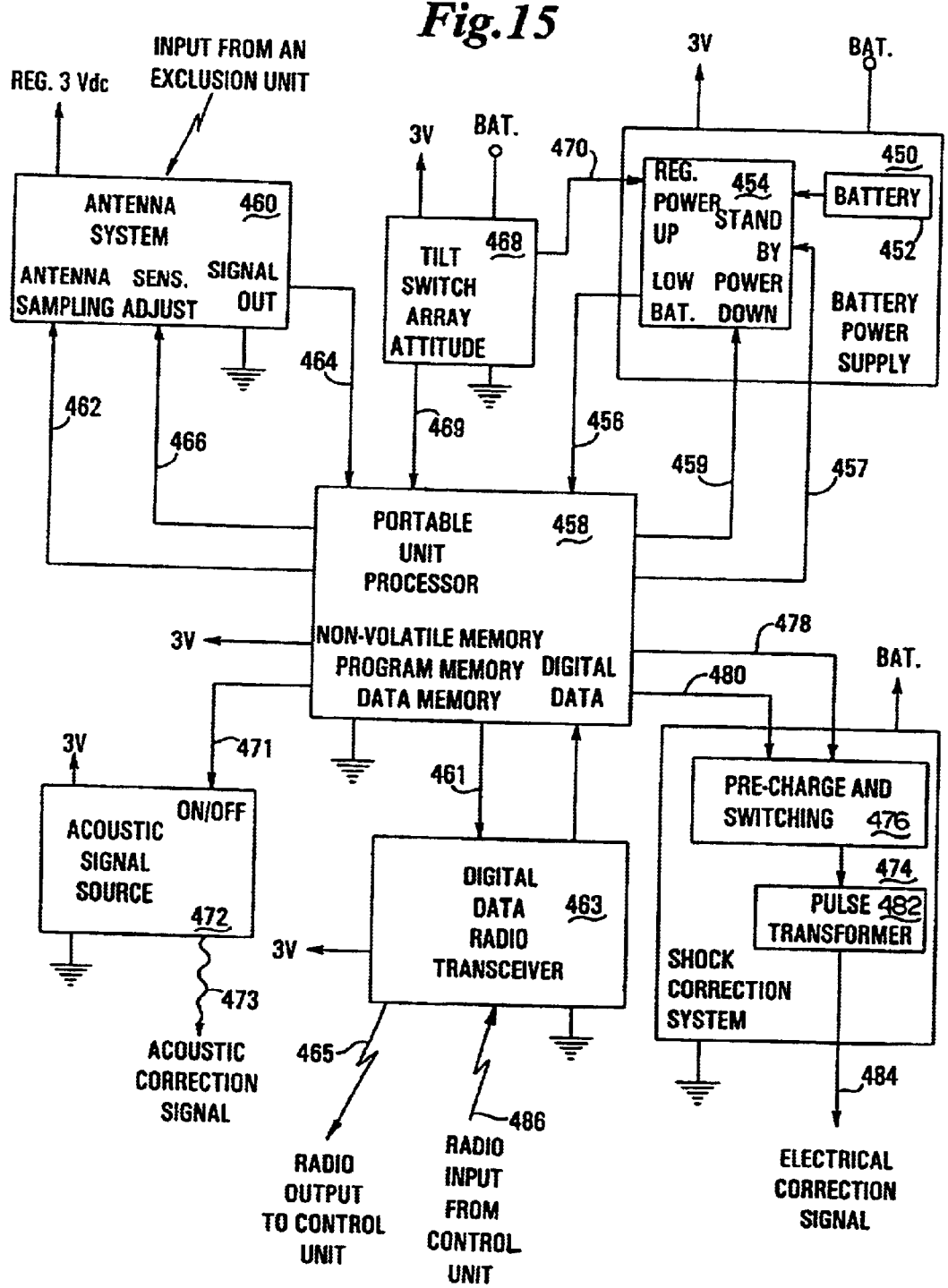
FIG. 15 illustrates a block diagram schematic of a portable unit of an electronic exclusion apparatus having a receiver in addition to an antenna system.
Figure 16:
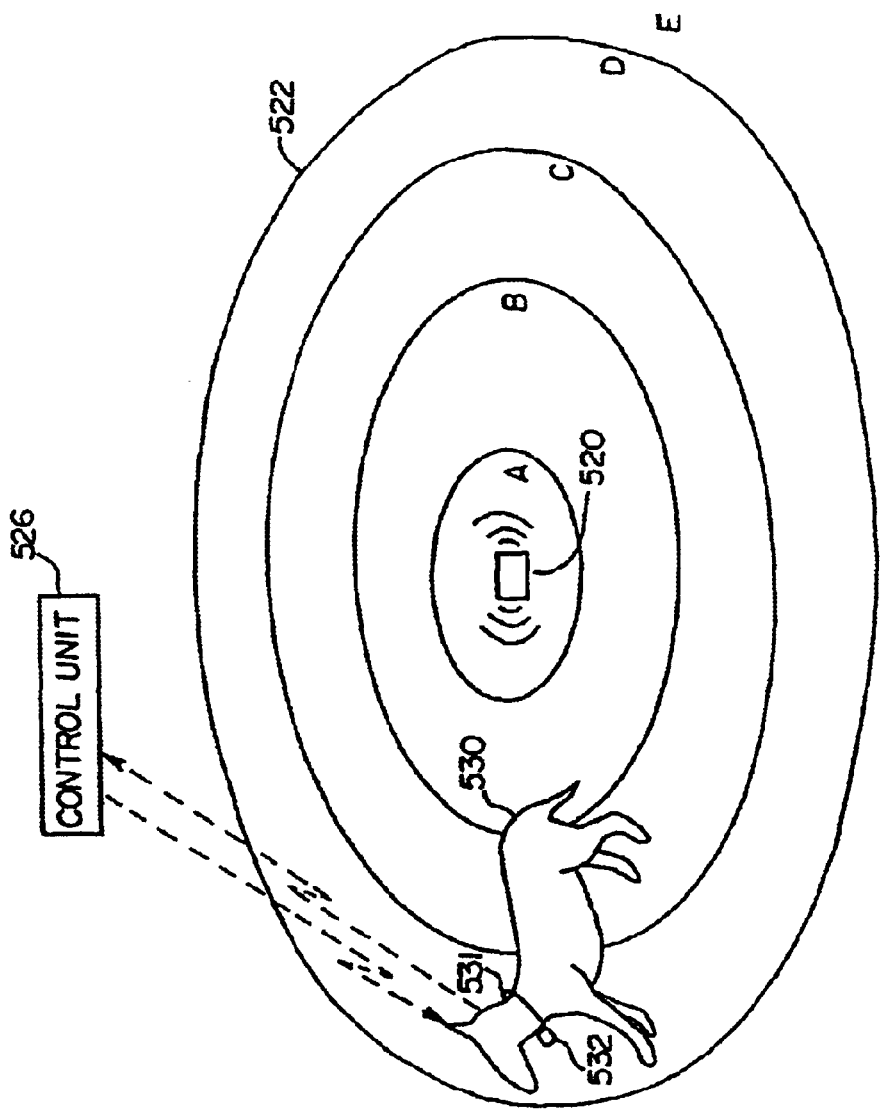
FIG. 16 illustrates a magnetic field around an electronic exclusion apparatus whereby the controller unit communicates directly with the portable unit.

FIGS. 15 and 16 illustrate an additional embodiment of the portable unit 532 whereby bidirectional communication may be established between the controller unit 526 and the portable unit 532. This may be useful for reasons such as transmitting commands to the portable unit 532 directly from the controller unit 526 so that the animal may stray from the exclusion unit 520, or the peripheral wire 622 (FIG. 17), yet remain in communication with the controller unit 526.

In FIG. 15, there is illustrated a block diagram of one embodiment of the portable unit 532 that is similar to the embodiment shown in FIG. 3 but in this embodiment the unit 532 has transceiving capabilities permitting bi-directional communications. Power is applied to the portable unit 532 by the battery power supply 450. The battery power supply 450 includes a battery 452, such as lithium, coin-shaped battery. A battery 452 of this type advantageously reduces the profile of the portable unit 532 and the period between battery changes. The voltage output from the battery 452 is regulated by a regulator circuit 454, including a regulator such as one from the MICREL 2570 series of regulator chips or from the Linear Tech LT1307 series, so as to give a regulated output of approximately 3 Volts or alternatively 3.3 Volts. The regulator circuit 454 ensures that the output from the battery power supply 450 is maintained at approximately 3 or 3.3 Volts, even when the voltage derived from the battery 452 is greater or less than approximately 3 or 3.3 Volts. The regulator circuit 454 detects when the voltage of the battery 450 has fallen below a pre-selected acceptable level, typically around 1 Volt. When such a low battery voltage condition is detected, the regulator circuit 454 directs a low battery voltage signal 456 to a portable unit processor 458. On receiving the low battery voltage signal 456, the portable unit processor 458 transmits a low battery voltage message over the data line 461 to a radio transceiver 463. The radio transceiver 463, typically operating in the 900 MHz band, then transmits a low battery voltage message to a control unit 526 (shown in FIG. 16) to alert the user of the low battery voltage condition of the portable unit 532.

Figure 17:
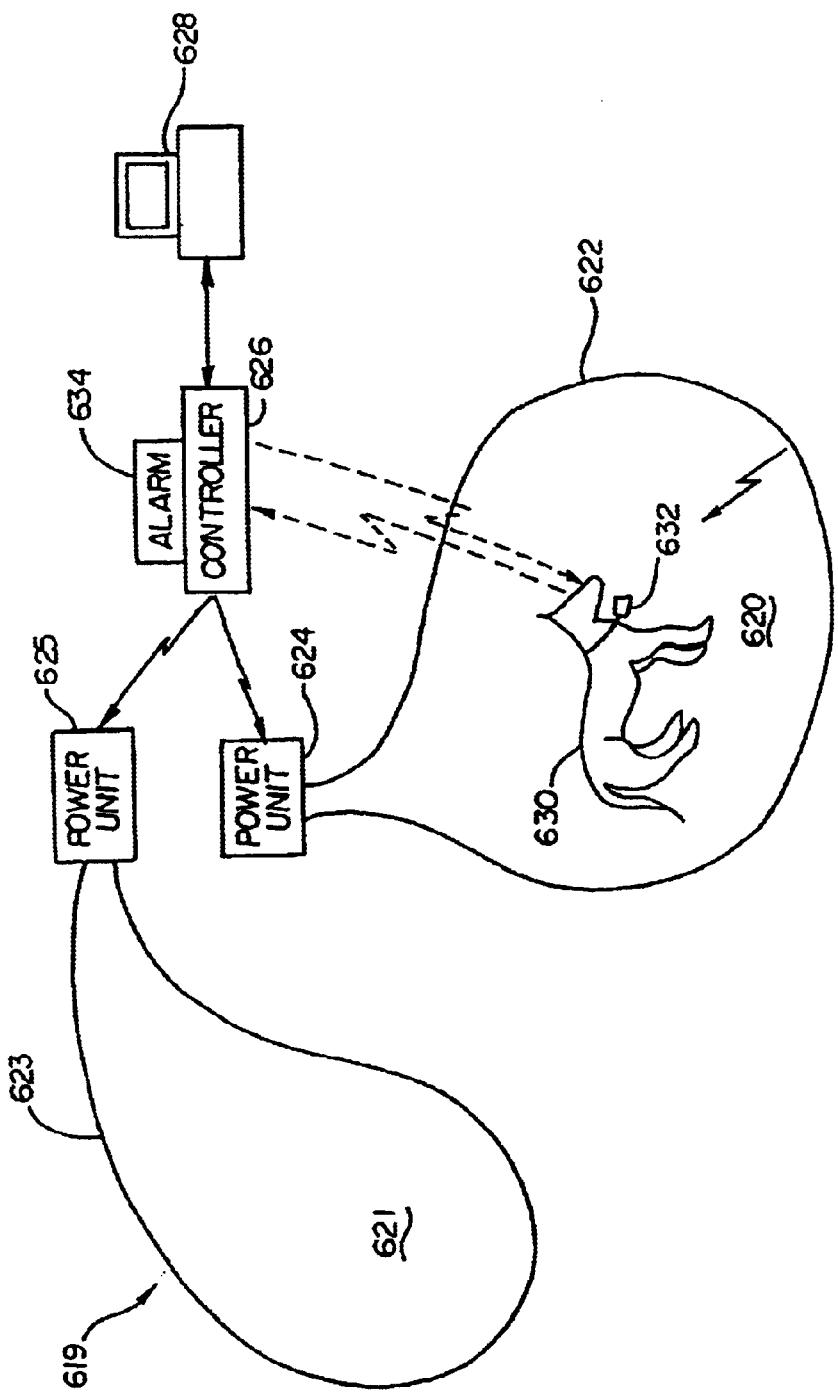
FIG. 17 illustrates a bounded area generated by a power unit.

The antenna system 460 preferably includes two orthogonal antennas for detecting the electromagnetic field 434 produced by the exclusion unit 520 (and/or for detecting the magnetic field produced by power unit 624 of FIG. 17). The portable unit processor 458 transmits an antenna sampling signal 462 to the antenna system 460 to sample the signals received from each antenna. If more than two antennas are used, the sampling signal selects one antenna from all the antennas present. The portable unit processor 458 may also adjust the sensitivity of the antenna system through use of a sensitivity adjust signal 466, as is described hereinbelow.

A tilt switch array 468, which may be of the ball bearing type, is provided on the portable unit 532. The tilt switch array 468 serves several functions, including the determination of activity of the animal 530, and directing orientation information to the portable unit processor 458 regarding the orientation of the portable unit 532. Since the tilt switches in the tilt switch array 468 are sensitive to movement, the movement of the animal 530 acts to repeatedly switch the tilt switches in the tilt switch array 468 between on and off states. A power-up signal 470 is fed from the tilt switch array 464 to the regulator circuit 454 in the battery power supply 450 in response to this activity. The regulator circuit 454 powers up the regulated approximately 3 Volt output when activity is detected by the tilt switch array 468. When no animal activity has been detected from the tilt switch array 468 for a timeout period, the portable unit processor 458 provides a no-activity signal 459 to power down the regulated approximately 3 Volt output until the activity signal 470 again signals when the tilt switch array 468 senses animal activity and powers up the approximately 3 Volt output. Before powering itself down, the portable unit processor 458 sends a notice of power down over the data line 461 to the radio transceiver 463. The radio transceiver 463 then transmits a notice, such as through signal 465, of power down to the control unit 526 so as not to cause a lost animal alarm. As such, this power conservation scheme results in a greatly extended battery life.

One potential aspect of this embodiment of the invention is that the control unit 526 may provide information for a profile table stored in the portable unit's memory that can be referenced by the processor 458 to determine the appropriate correction to apply to the animal 530. This profile table information may be received through the transceiver 463, and then a confirmation signal may be transmitted from the transceiver 463 to the control unit 526 to indicate that the portable unit 532 received the profile table information and a resend is unnecessary. Alternatively the control unit 526 may select an appropriate form of correction given to the animal 530 in response to the transceiver 463 communicating the distance between the animal 530 and the exclusion unit 520 to the control unit 526, such as through signal 465.

The control unit 526 may communicate the correction to the central processor 458 of the portable unit 532 through the transceiver 463, such as by signal 486, or alternatively through the antenna system 460. When the portable unit 532 has detected that the animal 530 is approaching the exclusion unit 520, a signal is transmitted from the portable unit 532 to the control unit 526 by the radio transmitter portion of transceiver 463. Alternatively, a separate receiver and transmitter may be used in place of the transceiver 463. The transmitted signal indicates the distance separating the animal 530 from the exclusion unit 520. The control unit 526 then determines what kind of correction should be applied to the animal 530 according to the separation distance. For example, the correction may be an acoustic signal, a low-level electric shock, or a high-level electric shock. Once the control unit 526 has selected the applicable correction, the control unit 526 then transmits a coded signal that is received by the transceiver 463 of the portable unit 532. The coded signal includes instructions for correcting the animal 530.

For example, if the instructions received from the control unit 526 indicate that the animal 530 should be corrected by an acoustic alarm, then an alarm signal 471 is directed to an acoustic signal device 472. The acoustic signal device 472 may be an intermittent buzzer, operating at audible frequencies or at ultra-sonic frequencies particularly detectable by the animal 530. If the instructions received from the control unit 526 indicate that the animal 530 should be corrected by the application of an electric shock, then the portable unit processor 458 activates the shock correction system 474. The shock correction system 474 generates an electrical shock signal 484 which is typically applied to the animal by a pair of contact pins. The shock correction system 474 includes a capacitive precharge and switching circuit 476 which is charged according to a precharge signal 478. After a predetermined charging time, the portable unit processor 458 directs a discharge signal 480 to the capacitive precharge and switching circuit 476. The capacitively stored energy is preferably discharged through a pulse transformer 482 to generate an electrical shock signal 484 which is applied to the animal 530. The voltage generated by the capacitive precharge circuit 476 is generally around 3 or 3.3 Volts, and the pulse transformer typically increases the voltage of the electrical shock signal 484 to approximately 1,000 Volts. The duration of the charging cycle determines the amount of charge capacitively stored in the capacitive precharge and switching circuit 476. The intensity of the electrical shock signal 484 applied to the animal 530 may be controlled by selected variation of the duration of the precharge cycle according to instructions received from the control unit 526 or from reference to the profile table stored in memory as previously discussed.

The profile table may be arranged such that one section of the table contains a correction bit for each exclusion unit 520 the animal may approach where the correction bit's value determines whether the animal receives correction for a particular exclusion unit 520. The next section of the profile table contains a value indicative of the correction to be applied to the animal for a given exclusion unit 520. This value may then be multiplied by a multiplier whose value is dependent upon the strength of the received signal in the antenna system 460 to find a product that is used to trigger a correction signal, whether it be audible or a shock. Alternatively, the control unit 526 may maintain a similar table for each portable unit 532 under its control and may communicate specific correction instructions to the collar.

This profile table of either the portable unit 532 or the control unit 526 may also be configured such that its bit values change depending upon the time of day. For example, a particular exclusion unit 520 may guard a room entrance where the room contains the animal's food. The profile table may be configured so that this exclusion unit 520 causes correction to be applied until a certain time of day, when the exclusion unit's signal may be ignored so that the animal may enter the room and eat. Detecting that the animal has passed by the exlcusion unit 520 again, indicating that the animal left the room, may be used as a trigger to reset the profile table so that the signal from the exclusion unit 520 guarding the room again results in correction when detected by the portable unit 532. The exclusion unit 520 may be provided its own table so that it provides an indication to the animal 530 that it may pass by the exclusion unit 520 without receiving correction during the appropriate time of day. The indication may be visual, such as a blinking light, or audible, such as a beep, or a combination of both.

Because the portable unit 532 is capable of directly receiving communication from the controller unit 526, the exclusion unit may provide only its code to the portable unit 532 through the magnetic signal 522. Furthermore, the controller unit 526 may also contain a transceiver to communicate with the portable unit's transceiver 463 or it may contain an additional transmitter for transmitting commands to the transceiver 463 in addition to a transmitter configured to transmit information to the exclusion unit 520.

Figure 19:
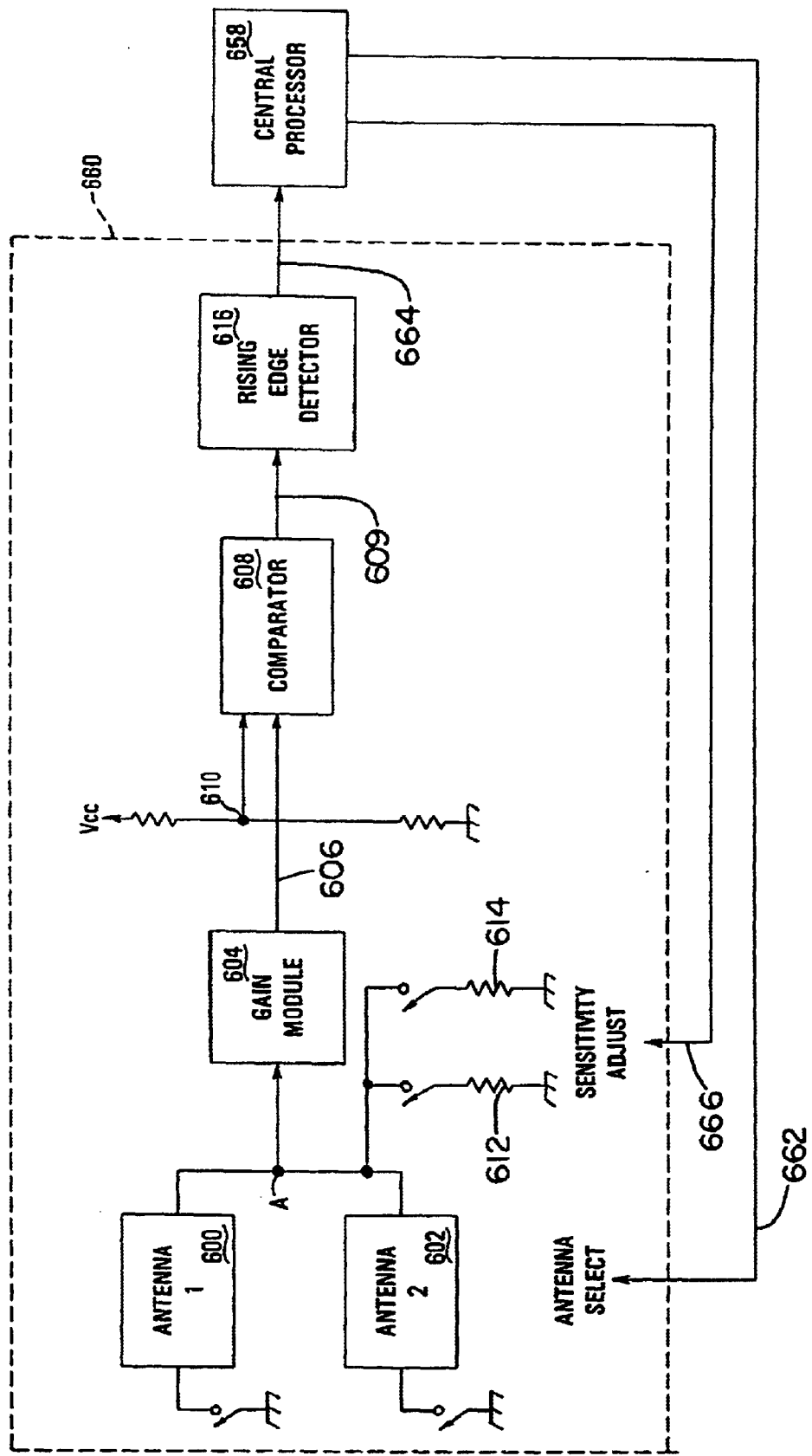
FIG. 19 illustrates a block diagram schematic of an antenna system provided in a portable unit having inbounds/out-of-bounds detection ability.

The portable unit processor 458 is preferably adapted to control the battery power supply 450 so as to reduce the possibility of radio frequency (RF) interference from the regulator circuit 454 interfering with the electromagnetic field 522 detected by the antennas 600 and 602 in the antenna system 660 of FIG. 19. The portable unit processor 458 turns the regulator circuit 454 off by the regulator stand by signal 457 so as to reduce RE interference. Turning the regulator circuit 454 off results in a loss of regulated voltage applied to the other elements of the portable unit 532. By maintaining a storage capacitor across the output of the battery power supply 450 in the portable unit 532, the regulator circuit 454 may be periodically turned off, for example around 2 milli-seconds at a time. After a 2 milli-second off interval, the regulator circuit 454 is reactivated by the regulator standby line 457 and an approximately 3 or 3.3-Volt regulated signal is re-applied to each of the elements in the portable unit 532, so as to recharge the storage capacitors.

FIG. 16 further indicates that the various zones as previously discussed may be created for the embodiment including the portable unit 532 and the controller unit 526. The strength of the magnetic field decreases with distance from the exclusion unit 520. The portable unit 532 may be configured to detect the variation in magnetic field strength, such as for zones A, B, C, and D, and correction associated with the particular zone may then be applied, as a result of the portable unit 532 receiving an instruction from the control unit 526 or from referencing the on-board profile table. The portable unit 532 may also detect that it is located in the outer zone E where the animal is free to roam, and therefore, no correction may be applied. As shown, the controller unit receives signals from the portable unit 532 and provides signals back to the portable unit 532 for reception by the transceiver 463.

It may also be desirable for the exclusion unit 520 to act as a repeater for the bi-directional communications between the portable unit 532 and the controller unit 526. In this case, the exclusion unit 520 (such as the exclusion unit shown in FIG. 6) may contain a radio transceiver in place of the radio receiver 200 of FIG. 6 wherein the radio transceiver is similar to or the same as the transceiver 463 of the portable unit shown in FIG. 15. Alternatively, the exclusion unit 520 may utilize the radio receiver 200 and a separate transmitter. Because the animal may stray farther away from the controller unit 526 than from the exclusion unit 520, the exclusion unit may serve to extend the range of the portable unit's communication with the controller unit 526 by receiving the radio signal from the controller unit 526 and relay the signal to the portable unit 532. In the same fashion, the exclusion unit 520 may receive the radio signal from the portable unit 532 and relay the signal to the controller unit 526.

Referring now to FIG. 17, an additional confinement system is shown wherein the animal may be included or excluded from an area defined by a peripheral boundary. FIG. 17 shows an animal control apparatus 619 and selected spaces 620 and 621 that are surrounded by buried wires 622 and 623 respectively, each buried wire 622 and 623 typically located a few inches below the surface and forming the peripheral boundary. The perimeters of the selected spaces may be defined in some other way, for instance the wire may not be buried, or the electrical conductor may not be in the form of a wire. The buried wires 622 and 623 are respectively powered by power units 624 and 625. The power units 624 and 625 are controlled by a controller 626 which is preferably connected to a computer 628 for maintaining an activity log. The following description refers to buried wire 622 and power supply 624, but may be applied equally to buried wire 623 and power supply 625. The animal 630 contained within the selected space 620 is provided with a portable unit 632. The portable unit 632 is preferably in the form of a collar placed around the animal's neck, but may also be a belt around the animal's abdomen or leg, or attached to the animal in a similar way.

The power unit 624 typically transmits a series of electrical pulses around the buried wire 622, so as to produce a modulated magnetic field in an area close to the buried wire 622 that weakens with distance from the wire. As mentioned, the portable unit 632 includes a magnetic sensor, such as antenna system 460, to detect the magnetic field produced by the buried wire 622, and is typically sufficiently sensitive to provide a positive detection of the magnetic field at a distance ranging between approximately four to six feet from the buried wire 622. The antenna system 460 may employ variable sensitivity, as previously discussed, to permit the creation of zones around the wire such as those created around the exclusion unit 520 of FIG. 16.

The portable unit 632 may include a radio transceiver 463, as previously described, which transmits a signal to the controller 626 indicating that a magnetic field of a given strength has been detected and receives a signal from the controller 626 indicating the type of correction to apply. Alternatively, the controller 626 may provide a signal to the power unit 624 which is then encoded in a signal provided on the wire 622 and received by the portable unit 632. Another alternative is for the portable unit 632 to reference an on-board profile table. If the portable unit 632 or controller 626 determines that the animal 630 has crossed the buried wire 622 so as to escape from the selected space 620, then the controller 626 may activate an alarm 634 which indicates to the owner or guardian of the animal 630 that the animal 630 has left the selected space 620.

As discussed, the portable unit 632 is provided with a magnetic field sensor which senses the strength and direction of the magnetic field. The strength of the magnetic field is determined by the distance from the buried wire 622 to the portable unit 632. The direction of the magnetic field is determined by whether the animal 630 is approaching the buried wire 622 from within or outside the selected space 620. One potential aspect of this embodiment of the present invention is that if an animal 630 is intended to be confined to the space 620 but has escaped, then the portable unit 632 is operable so as not to provide correction to the animal 630 if the animal subsequently attempts to re-enter the selected space 620 by crossing the buried wire 622 from the outside. Similarly, if the animal is to be excluded from the space 620 but has entered into it, then the portable unit 632 is operable so as not to provide correction to the animal 630 if the animal subsequently attempts to exit the selected space 620.

The signals transmitted by the power unit 626 and received by the portable unit 632 are discussed with reference to FIGS. 18 and 20A–20E. The power unit 626 transmits a series of current pulses around the buried wire 622 to generate the magnetic field 644 detected by the portable unit 632. The current pulses may be encoded with information, such as data or commands, from the controller 626 if the portable unit 632 is not provided with a transceiver for communicating with the controller 626. With or without the transceiver 463, the portable unit 632 of this embodiment utilizes a magnetic field receiver for detecting the proximity to the wire 622. The pulses on the wire 622 may also be encoded with a code for the power unit 624. The following discussion describes a preferred approach to encoding the current pulses and decoding them with the portable unit 632 so as to detect whether the animal is inside or outside of the bounded area.

Figure 18:
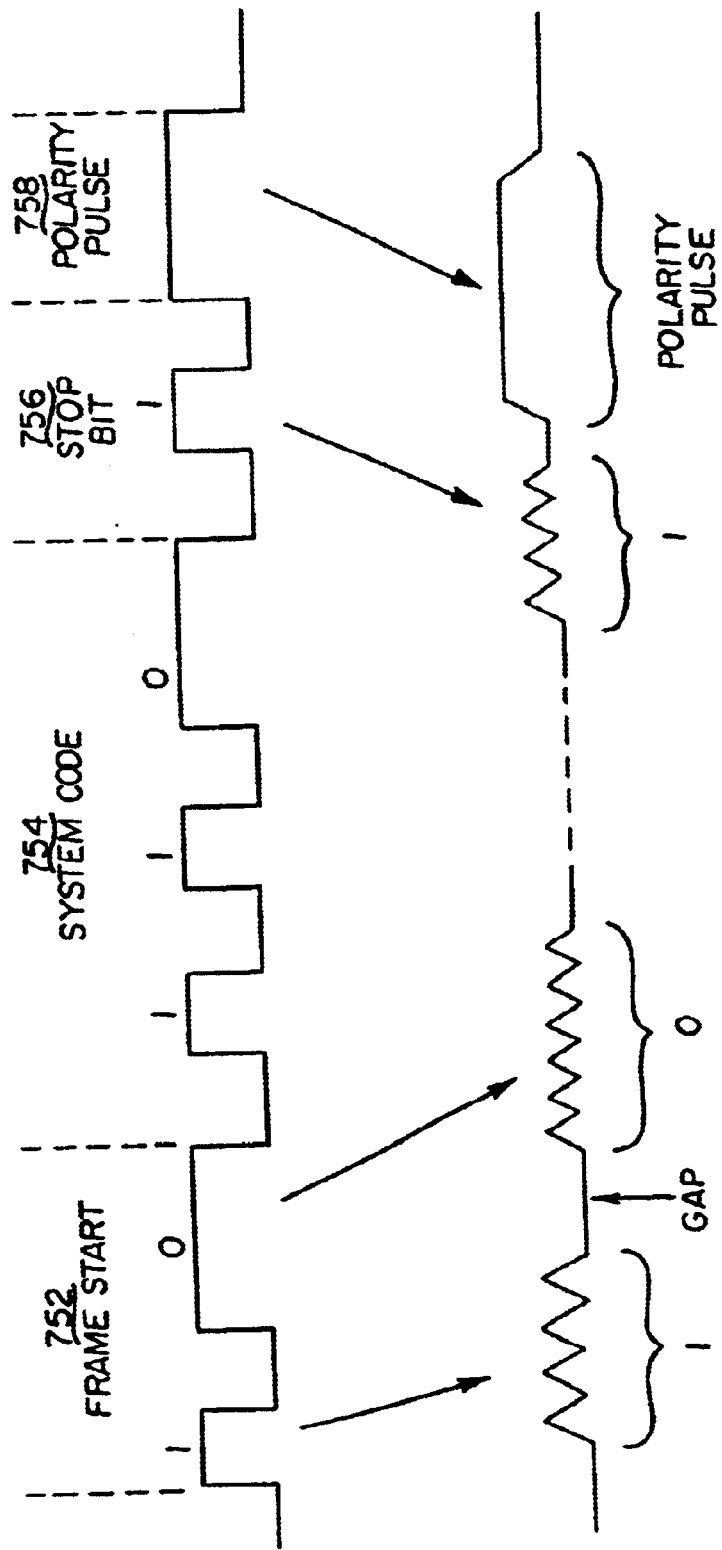
FIG. 18 illustrates waveforms generated by the power unit.

FIG. 18 illustrates one example of a signal transmitted by the power unit 624 along the buried wire 622. In this example, the signal may include a frame 750, where the exemplary frame is a binary word having four or more distinct components. The first component is the frame start 752 which includes a "1" and a "0". The second component is the system code, typically comprising three bits, and which indicates a code number related to the controller unit 626. The system code 754 is used, for example, to distinguish between pet containment systems operating in neighboring back yards. A similar signal may be transmitted by an exclusion unit 520 of FIG. 16 and a system code 754 may be used to distinguish between pet containment systems operating in adjacent living spaces such as neighboring apartments.

Following the system code 754, may be the command data (not shown), typically comprising 8 bits. The command data component may include a header indicating which portable unit 632 out of a plurality of portable units the following command is directed to. The remainder of the command data component may also include the instructions for the particular portable unit 632, such as correction commands or profile table information. As mentioned, the command data may be transmitted from a radio transmitter or transceiver of the controller 626 to a radio transceiver or radio receiver of the portable unit 632, and therefore, not be included in the frame 650. The next component of the frame is stop bit 756 which is a "1" that is followed by the last component, a polarity pulse 758.

Figure 20A:
FIGS. 20A–20E illustrates alternative waveforms generated by the power unit and waveforms produced by the antenna system in response to the power unit waveforms.

The digits in the binary frame 650 of this example may be produced by burst width modulation of approximately 10 KHz bursts. For example, a "1" may typically be represented by a burst of a few milliseconds at 10 KHz, and "0" may typically be represented by a longer burst at 10 KHz. A standard separation between bits of a few millisecond is provided. Other schemes, such as Manchester encoding may be used as well, as shown in FIG. 20A, whereby burst width modulation of the data is not used but the Manchester encoded data is carried by 10 KHz bursts. Manchester encoding may be desired due to the balanced nature of the resulting signal.

When using burst width modulation, as shown in FIG. 18, the length of the frame 250 can vary, depending on the number of zeros present in the frame 250. The separation between adjacent frames may be varied so that the time lapse between frame starts is constant between all frames. The stop bit 756 transmitted by the power unit 624 of this embodiment includes a burst followed by a polarity pulse. The polarity pulse is a unipolar pulse without 10 KHz modulation, the width of which is typically about 3.5 seconds when Manchester encoding is used for the data. It is understood that the frequency of the bursts may be at frequencies other than 10 KHz for burst width modulation, Manchester encoding, or other data transfer methods.

FIG. 19 illustrates a block schematic diagram of the antenna system 660 (such as antenna system 460 of FIG. 15) used by the portable unit 632. Antenna one 600 and antenna two 602 are oriented so that their respective directions of maximum sensitivity are orthogonal. Additional antennas may be used, and a third antenna may be implemented so that its maximum sensitivity is orthogonal to both the maximum sensitivity of antenna one 600 and antenna two 602. The antennas 600 and 602 are preferably oriented on the animal 630 so that the plane defined by the directions of maximum sensitivity for each antenna is a vertical plane extending forward from the animal 630. For example, if the animal 630 is a dog, then the plane defined by antenna one 600 and antenna two 602 is a vertical plane parallel to the dog's spine, and dividing the dog into right and left halves. A third antenna could be added to account for three-dimensional space rather than a vertical plane. Each antenna 600 and 602 has associated with it one or more tilt switches in the tilt switch array 468 (FIG. 15). These associated tilt switches indicate the orientation of the antenna, so that the portable unit processor 658 (such as processor 458 of FIG. 15) may determine the attitude of each antenna 600 and 602 and subsequently determine which side of the buried wire the animal 630 is on, as described hereinbelow.

The output A from both antennas 600 and 602 is directed to a gain module 604, which is typically an operational amplifier operating in the linear region. The output 606 from the gain module 604 is directed to a comparator 608 which compares the gain module output 606 with a reference signal voltage 610. The sensitivity adjust signal 666 selects programmable resistors 612 and 614 in the signal attenuator so as to vary the amplitude of the input to the gain module 604. The use of two programmable resistors 612 and 614 results in four sensitivity settings for the gain module output, resulting in a comparator 608 output 609 indicative of the level of magnetic field around the periphery wire 622. Other signal attenuator configurations may be used as well, such as using 3 programmable resistors to set up eight detectable zone. Furthermore, the resistors may be connected to addressable ports of the central processor 658 rather than to programmable switches as shown. When the comparator output 609 is high, even though the programmable resistors 612 and 614 are switched so as to produce the smallest gain module output 606, then the animal has entered the zone closest to the wire 622. If, on the other hand, there is a zero output signal 609 from the comparator 608 for all levels of gain module output signal 606, the animal 630 is assumed to be adequately distanced from the wire 622. An alternative approach to determining in which zone the animal 630 is located is to maintain the input to the gain module 604 with a single sensitivity and to sample different reference voltages 610. In another alternative approach, the programmable signal attenuator, including the switchable resistors 612 and 614, and the comparator 608 may be included with the portable unit processor 658 in a single chip.

The output from the comparator 608 is directed to a rising edge detector 616 in this embodiment. The output from the detector 616 is directed to the portable unit processor 658 as the data out signal 664. The portable unit processor 658 samples the signal from one antenna at a time using the antenna sampling signal 662.

Once the portable unit processor 658 has processed the data out signal 664 from the antenna system 660, the processed data, including an out of bounds signal, is transferred to the radio transceiver 463 for transmission to the controller 626. The information packet transmitted by the radio transceiver or separate transmitter typically includes a code identifying the portable unit 632, data indicating which zone the portable unit 632 is in, and the out of bounds signal.

FIG. 20A further illustrates the signal carried by the periphery wire 622 that uses Manchester encoding whereby the encoded data is carried by 10 KHz square bursts. As shown, the encoded signal has a carrier burst frequency of 2F. The ending portion (i.e. high signal value) of the stop bit is shown, where the stop bit is defined as a logic one which has a zero signal amplitude (not shown) followed by the high signal value. Assuming a 10 KHz carrier, the complete high signal value portion of the stop bit as shown consists of 4 bursts having a period of 0.1 msec/burst for a total bit duration of 0.8 msec. Other bit durations and carrier frequencies are possible as well. The stop bit is followed by a gap and then a polarity pulse is provided. The duration of the last carrier burst of the stop bit plus the gap is X (e.g. 5 milli-seconds). The width of the polarity pulse is given by W (e.g. 3.5 milli-seconds).

Figure 20B:
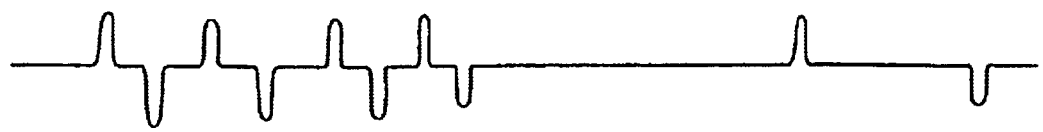

FIG. 20B illustrates the signal received by the antenna system 660 as it exists at point A of FIG. 19. The antenna 600 or 602 may be configured so that positively oriented pulses are generated for each rise of the carrier burst and negatively oriented pulses are generated for each fall for a given portable unit orientation and for a given side of the boundary wire 622. Portable unit orientation refers to whether an antenna 600 or 602 that is closest to parallel to the vertical component of the magnetic field around boundary wire 622 is upward or downward. The tilt switch array 468 detects the antenna closest to parallel to the vertical component and also detects whether the orientation of that antenna is upwards or downwards.

It may be chosen that when the receiving antenna 600 or 602 is upwards and when the vertical component of the magnetic field is upwards on the side of boundary wire 622 where the portable unit 632 is located, the waveform shown in FIG. 20B would result. In this waveform, a signal rise from the wire results in a positively oriented pulse received by the receiving antenna 600 or 602 while a signal fall results in a negatively oriented pulse. If the receiving antenna 600 or 602 becomes downwardly oriented while the animal remains on the same side of the bounded area or if the animal moves to the other side of the boundary wire 622 while the antenna 600 or 602 remains upwards, then the received signal at point A of FIG. 19 is inverted, as is shown in FIG. 20D.

Figure 20C:
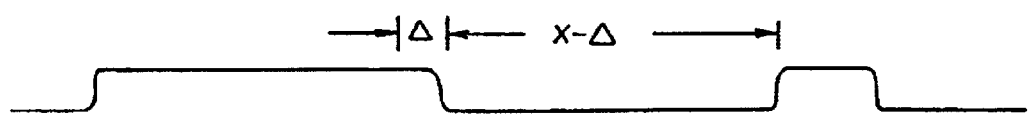

For the waveform of FIG. 20B, after the signal has been amplified by gain module 604 of FIG. 19, it is passed to the comparator 608 that allows only the positively oriented pulses to pass through. The positively oriented pulses are then supplied to the rising edge detector 616, such as a one-shot multivibrator. For each rising edge, the detector 616 outputs a detector pulse having a time constant large enough to maintain an output pulse width (A of FIG. 20C) with a duration longer than the positive pulse separation from the comparator. For burst width modulation (such as shown in FIG. 18), the time constant may be set so that a rising edge of a "1" results in one output pulse while rising edges of a "0" results in an output pulse consisting of two continuous output pulses which processor 658 may then interpret. For Manchester encoding, this output pulse width maintains an output pulse having a width approximately that of the high value portion of the encoded stop bit and enables the processor 658 to interpret the Manchester encoded data. The output of the detector 616, as shown in FIG. 20C, results from the received waveform in FIG. 20B. The output of the detector 616, as shown in FIG. 20E, results from the received waveform in FIG. 20D, which was the inverted version of the received waveform in FIG. 20B.

As is shown in FIGS. 20B and 20C, the polarity pulse created by the wire 622 results in one received positive pulse and one received negative pulse at point A of FIG. 29. For a given antenna convention and current direction, FIG. 20B indicates an animal within the bounded area and FIG. 20D indicates an animal outside of the bounded area. In FIG. 20B, the positive pulse received due to the polarity pulse occurs first and passes through the comparator 608 while the received negative pulse is blocked. The detector 616 then produces a detector pulse having Δ width in response to the received positive pulse. The detector pulse from the detector 616 begins at (X–Δ) time from the termination of the last received pulse resulting from the stop bit.

Figure 20D:
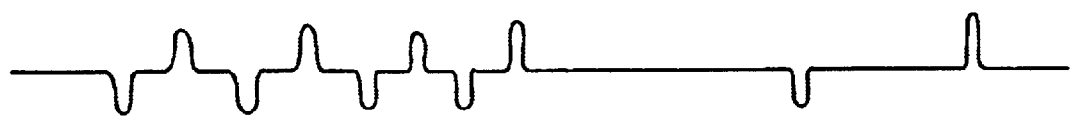
Figure 20E:
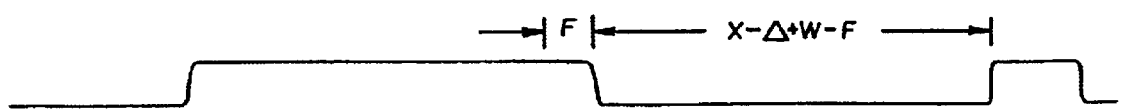

In FIG. 20D, the negative pulse received at point A due to the polarity pulse occurs before the received positive pulse, since the vertical component of the field has the opposite direction on the outside of the bounded area. This received negative pulse at point A is blocked by the comparator 608. The received positive pulse at point A due to the polarity pulse is delayed by the polarity pulse width W relative to the received positive pulse at point A for the waveform of FIG. 20C. The detector 616 therefore does not produce a detector pulse in response to the received positive pulse until (X–Δ+W–F) time from the termination of the pulse generated from the stop bit. Thus, the received positive pulse occurs later in time by (W–F) than it does for the situation of FIG. 20C.

The central processor 658 may determine whether the animal is inside or outside of the bounded area by knowing the orientation of the receiving antenna from the tilt switch and by knowing whether the final pulse from the detector 616 for a received frame had a delay of (X–Δ) or the longer delay of (X–Δ+W–F). For example, the processor may be programmed for a first sign convention (i.e., a particular direction is considered upward for an antenna) and for a first current direction (i.e., counter-clockwise) for the polarity pulse in the boundary wire 622. If the processor 658 detects that the receiving antenna is upwardly oriented and that the final detector pulse had a short delay, then the animal is assumed to be inside the bounded area. If the processor 658 detects that the receiving antenna is downwardly oriented and that the final detector pulse has a short delay, then the animal is assumed to be outside the bounded area. If the processor 658 detects that the receiving antenna is upwardly oriented and that the final detector pulse had a long delay, then the animal is assumed to be outside the bounded area. Finally, if the processor 658 detects that the receiving antenna is downwardly oriented and that the final detector pulse has a long delay, then the animal is assumed to be inside the bounded area.

The processor may be programmed for a second sign convention (i.e. opposite direction is considered up for an antenna) for the first polarity pulse current direction in the boundary wire 622. In that case, the result is reversed so that the animal is determined to be on the opposite side of the wire 622 for the same antenna orientation and detector pulse delay from the example above. Likewise, if the processor is programmed for the first sign convention but the polarity pulse current direction is reversed in the boundary wire 622, the animal would be determined to be on the opposite side of the wire 622. A truth table, table 1, is provided below to illustrate these variations.

Thus, the portable unit 532 should be placed on the animal in a given orientation to produce the correct detection of being out of bounds. The proper orientation may be found by using a calibration technique whereby the installer approaches the boundary while in-bounds with the portable unit 532 to determine whether the portable unit responds with a correction. If not, then reversing the orientation of the portable unit 532 by flipping it over will result in the correct orientation for the portable unit 532 to be placed on the animal 530.

TABLE 1

|  | Tilt Switch Result | |
| --- | --- | --- |
| First Convention | Up | Down |
| First Current Direction | | |
| Short Delay | Inside | Outside |
| Long Delay | Outside | Inside |
| Opposite Current Direction | | |
| Short Delay | Outside | Inside |
| Long Delay | Inside | Outside |
| Opposite Convention | Up | Down |
| First Current Direction | | |
| Short Delay | Outside | Inside |
| Long Delay | Inside | Outside |
| Opposite Current Direction | | |
| Short Delay | Inside | Outside |
| Long Delay | Outside | Inside |

Once the portable unit 632 has determined that the animal is inside or outside, this information along with the zone may be transmitted back to the controller unit 626. The controller unit 626 may then determine the appropriate correction. The correction instruction can then be transmitted back to the portable unit 632, such as by modulating the command into the magnetic field generated by the wire 622, Manchester encoding the command into the signal on the wire 622, or by transmitting the command through radio signals received by the portable unit's transceiver 463, if any. Alternatively, the portable unit 632 may reference the profile table to determine the appropriate correction based on the zone and in/out of bounds information.

In summary, an electronic system for deterring an animal from entering an exclusion area or entering or leaving a bounded area has been described. The system also provides important information to the user, such as battery level condition, provides an optional alarm when the animal enters an exclusion area or is trapped in an exclusion area, and allows the user to maintain a log of animal activity and behavior.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A portable unit for providing a correction to an animal, comprising:
    a sensor configured to detect a first signal indicating that the animal has approached an inappropriate location;
    a transmitter configured to provide a second signal indicating information about the portable unit; and
    a receiver configured to detect a third signal having an instruction for the portable unit, and wherein the instruction of the third signal includes a degree of correction to apply to the animal.

2. The portable unit of claim 1, wherein the first signal includes an identification of the source of the first signal.

3. The portable unit of claim 1, wherein a strength of the first signal indicates a zone in which the animal is located.

4. The portable unit of claim 1, wherein the information of the second signal includes the source of the first signal.

5. The portable unit of claim 1, wherein the information of the second signal includes the strength of the first signal.

6. The portable unit of claim 1, wherein the information of the second signal includes an identification of the portable unit.

7. The portable unit of claim 1, wherein the instruction of the third signal includes an identification of the source of the third signal.

8. The portable unit of claim 1, further comprising an audible correction means and an electrical correction means, and wherein the degree of correction to apply to the animal corresponds to an audible correction when a minimal correction is appropriate and corresponds to an electrical correction when a maximum correction is appropriate.

9. The portable unit of claim 1, further comprising a memory containing a profile table indicating correction to be applied to the animal, wherein the third signal includes correction information to be stored in the profile table and wherein the second signal is an acknowledgement of receiving the third signal.

10. The portable unit of claim 1, further comprising a tilt switch array linked to the sensor, wherein the sensor detects the first signal in response to the tilt switch array conducting the first signal in response to the animal approaching the inappropriate location.

11. The portable unit of claim 1, wherein the first signal lies in a first frequency band and the second and third signals lie in a second frequency band.

12. The portable unit of claim 1, wherein the transmitter and the receiver are components of a transceiver.

13. A method for providing correction to an animal, comprising:
    sensing a first signal at a sensor at a portable unit worn by the animal wherein the first signal is indicative of a location of the animal;
    transmitting over the air a second signal from the portable unit worn by the animal to send information about the portable unit to a controller unit;
    transmitting over the air a third signal from the controller unit to the portable unit to indicate the correction; and
    receiving over the air the third signal at a receiver of the portable unit to provide the appropriate correction, wherein the correction is based at least on the source of the first signal, the source of the second signal, and the strength of the first signal.

14. The method of claim 13, wherein the second signal is provided in response to sensing the first signal at the portable unit, the first signal indicating that the animal has approached an inappropriate location, the second signal providing an indication to the controller unit that the animal has approached the inappropriate location, and wherein the third signal is provided to the portable unit from the controller unit in response to the controller unit receiving the second signal, the third signal providing the indication of the appropriate correction to apply to the animal.

15. The method of claim 13, wherein the portable unit has a memory for storing a profile table containing indications of the appropriate correction to apply, wherein the third signal contains the indications of the appropriate correction that are to be stored by the portable unit in response to receiving the third signal, and wherein the second signal is an acknowledgement of receiving the third signal.

16. The method of claim 14, wherein the first signal is broadcast by a unit to exclude the animal from at least a portion of a broadcast range surrounding the unit.

17. The method of claim 14, wherein the first signal is provided on a wire by a unit to confine the animal to an area bounded by the wire.

18. The method of claim 14, wherein the first signal is broadcast by a unit to confine the animal to at least a portion of a broadcast range surrounding the unit.

19. The method of claim 14, wherein the first signal is provided on a wire by a unit to exclude the animal from an area bounded by the wire.

20. The method of claim 14, wherein the first signal lies in a first frequency band and the second and third signals lie in a second frequency band.

21. The method of claim 14, wherein the first signal indicates an identification of the source of the first signal.

22. The method of claim 13, wherein the second signal indicates an identification of the source of the second signal.

23. The method of claim 13, wherein the third signal indicates an identification of the source of the third signal.

24. The method of claim 14, wherein the second signal indicates the strength of the first signal.

* * * * *

UNITED STATES PATENT AND TRADEMARK OFFICE
CERTIFICATE OF CORRECTION

PATENT NO. : 6,657,544 B2
DATED : December 2, 2003
INVENTOR(S) : Barry et al.

It is certified that error appears in the above-identified patent and that said Letters Patent is hereby corrected as shown below:

Column 15,
Lines 57-58, "such as lithium," should read -- such as a lithium, --

Column 18,
Line 34, "to reduce RE interference." should read -- to reduce RF interference. --

Column 23,
Line 3, "(A of FIG. 20C)" should read -- ($\Delta$ of FIG. 20C) --

Signed and Sealed this

Twentieth Day of July, 2004

JON W. DUDAS
*Acting Director of the United States Patent and Trademark Office*